United States Patent [19]
Dieterle et al.

[11] Patent Number: 6,078,152
[45] Date of Patent: Jun. 20, 2000

[54] BIDIRECTIONAL E.C. MOTOR AND METHOD OF OPERATING THE MOTOR

[75] Inventors: Roland Dieterle, St. Georgen; Arno Karwath, Rottweil; Herman Rappenecker, Vohrenbach, all of Germany

[73] Assignee: Papst-Motoren GmbH & Co. KG, St. Georgen, Germany

[21] Appl. No.: 09/101,229

[22] PCT Filed: Dec. 18, 1996

[86] PCT No.: PCT/EP96/05673

§ 371 Date: Jul. 2, 1998

§ 102(e) Date: Jul. 2, 1998

[87] PCT Pub. No.: WO97/25768

PCT Pub. Date: Jul. 17, 1997

[30] Foreign Application Priority Data

Jan. 10, 1996 [DE] Germany ............ 196 00 628

[51] Int. Cl.⁷ ................................. H02P 1/00
[52] U.S. Cl. ............... 318/264; 318/254; 318/246
[58] Field of Search ..................... 318/254, 264, 318/701, 246, 322, 332, 341, 280, 281; 360/75

[56] References Cited

U.S. PATENT DOCUMENTS

| | | | |
|---|---|---|---|
| 3,364,407 | 1/1968 | Hill | 318/138 |
| 3,377,535 | 4/1968 | Yasuoka | 318/138 |

(List continued on next page.)

FOREIGN PATENT DOCUMENTS

| | | |
|---|---|---|
| 0 084 156 A1 | 7/1983 | European Pat. Off. . |
| 0 254 537 | 1/1988 | European Pat. Off. . |
| 0 533 296 A1 | 3/1993 | European Pat. Off. . |
| 0 766 370 A2 | 4/1997 | European Pat. Off. . |

(List continued on next page.)

OTHER PUBLICATIONS

F.D. Carvajal et al., Texas Instruments Linear Circuits Dept., "A Tutorial on the Use of the Hall Effect," in Proceedings, Motor–Con, Apr. 1985 (pp. 115–125).

Rolf Müller, "Zweipulsige kollectorlose Gleichstrommotoren," [Two–Pulse Collectorless DC Motors], in *ASR Digest für angewandte Antriebstechnik* [ASR Digest for Applied Drive Technology], pp. 27–31, 1977.

Derwent WPI English abstract of DE–OS 24 03 432, Kögler & Kühnlein, pub. Jul. 31, 1975.

Patent Abstracts of Japan, vol. 15, No. 277 (E–1089), Jul. 15, 1991, abstracting Japanese laid open publication 3–093 489–A of Apr. 18, 1991, Horie/Copal Electron Co., based on application 1–231 167 of Sep. 6, 1989, entitled Driving of DC Brushless Motor.

*Primary Examiner*—Robert E. Nappi
*Assistant Examiner*—Rita Leykin
*Attorney, Agent, or Firm*—Milton Oliver; Ware, Fressola, Van Der Sluys & Adolphson LLP

[57] ABSTRACT

In a method of starting a two-pulse electronically commutated dc motor, which is designed for operation in a preferred direction, for purposes of startup in a desired direction, the following steps are carried out: after start-up, the rotor of the motor is driven, according to a start routine (S118), by supplying current alternately in a first and a second direction, into forced oscillation about a rest position; during the start routine, monitoring (as to whether the rotor has started up) is performed; whenever it is determined that the rotor has started up, the start routine is exited. Further, a method is provided, by means of which the rotational position of the rotor, at which the current of a winding phase is switched on, is optimized as a function of rotation speed and rotation direction.

43 Claims, 13 Drawing Sheets

U.S. PATENT DOCUMENTS

| | | | |
|---|---|---|---|
| 3,840,761 | 10/1974 | Mueller | 318/49 R |
| 3,873,898 | 3/1975 | Mueller | 318/138 |
| 4,030,005 | 6/1977 | Doemen | 318/138 |
| 4,374,347 | 2/1983 | Mueller | 318/138 |
| 4,435,673 | 3/1984 | Hagino | 318/254 A |
| 4,535,275 | 8/1985 | Müller | 318/254 |
| 4,641,066 | 2/1987 | Nagata et al. | 318/254 |
| 4,724,365 | 2/1988 | Mueller | 318/254 |
| 4,748,387 | 5/1988 | Tanuma | 318/254 |
| 4,755,699 | 7/1988 | Schmider | 310/68 R |
| 4,978,895 | 12/1990 | Schwarz | 318/254 |
| 5,155,419 | 10/1992 | Naito | 318/254 |
| 5,200,675 | 4/1993 | Woo | 318/254 |
| 5,327,054 | 7/1994 | Gleim | 318/255 |
| 5,349,275 | 9/1994 | Müller | 318/254 |
| 5,486,742 | 1/1996 | Chino | 318/254 |
| 5,590,235 | 12/1996 | Rappenecker | 388/803 |

FOREIGN PATENT DOCUMENTS

| | | |
|---|---|---|
| 2 345 755 | 10/1977 | France . |
| 22 63 242 C2 | 6/1974 | Germany . |
| 24 03 432 A1 | 7/1975 | Germany . |
| 24 19 432 A1 | 10/1975 | Germany . |
| 24 63 006 C2 | 10/1975 | Germany . |
| 28 56 538 C2 | 8/1979 | Germany . |
| 30 10 435 C2 | 9/1981 | Germany . |
| 32 09 394 A1 | 9/1983 | Germany . |
| 32 35 774 A1 | 3/1984 | Germany . |
| 34 34 965 A1 | 4/1985 | Germany . |
| 35 13 167 A1 | 10/1986 | Germany . |
| 38 19 062 C3 | 12/1989 | Germany . |
| 38 19 064 A1 | 12/1989 | Germany . |
| 39 42 003 A1 | 6/1991 | Germany . |
| 41 36 538 A1 | 5/1992 | Germany . |
| 41 22 109 A1 | 1/1993 | Germany . |
| 38 19 064 C3 | 5/1995 | Germany . |
| 44 41 372 A1 | 6/1995 | Germany . |
| 44 38 569 A1 | 5/1996 | Germany . |
| 196 08 424 A1 | 9/1997 | Germany . |
| 2 224 896 | 5/1990 | United Kingdom . |

BIDIRECTIONAL E.C. MOTOR AND METHOD OF OPERATING THE MOTOR

FIELD OF THE INVENTION

The invention relates to a method of starting an electronically commutated direct current motor and a motor for carrying out such a method.

BACKGROUND

There are motors of this kind, which are optimized for operation in one rotational direction ("preferred direction") and therefore starting up in the opposite direction, referred to below as the "reverse direction", is either impossible or can only be achieved with difficulty, so that starting in the reverse direction is not reliably assured. These motors operate with an auxiliary torque which has a very unfavorable course when operating in the reverse direction. This auxiliary torque is usually formed as a reluctance auxiliary torque. However, a mechanically generated auxiliary torque would also be possible within the scope of the invention.

Endeavors have been made to give motors of this kind the capacity to start in both rotation directions by virtue of an auxiliary pole being provided between their main poles, see DE 32 35 774 C2, Müller/Papst Motoren, but motors of this kind are costly due to their special construction and for this reason, have not been able to gain acceptance in actual use.

SUMMARY OF THE INVENTION

It is therefore an object of the invention to provide a new method of operating an electronically commutated motor.

According to the invention, this object is achieved by a method of starting a two-pulse, electronically commutated direct current motor, which is designed for operation in a preferred direction, in one of the two rotation directions, referred to below as the "desired" rotation direction, comprising the following steps:

a) after being switched on, the rotor of the motor is set into forced oscillation around its rest position by means of a start routine - by means of supplying current alternately in one rotation direction and the opposite rotation direction; alternating current supply, first in the one rotation direction and then in the other;

b) during the start routine, the motor is monitored to see whether it starts up;

c) when it is determined that the motor has started up, the start routine is exited.

Since the rotor is set into a controlled forced oscillation around its rest position after starting, one succeeds in very reliably achieving the startup in both rotation directions, even with this type of motor.

In a particularly advantageous manner, at least when starting counter to the preferred direction, the forced oscillation comprises at least one current supply cycle with a current supply counter to the desired rotation direction and a current supply in the desired rotation direction. In the course of this, the rotor of the motor moves jerkily back and forth and builds up momentum, so to speak, for starting up in the desired rotation direction. It has turned out that, in this manner, a startup counter to the preferred direction can also be assured with considerable reliability.

In order to monitor the startup, the procedure is advantageously followed so that, during the current supply of the motor in the desired rotation direction achieved with the start routine, the number of signal changes in the output signal of a rotor position sensor associated with the motor is counted. It is particularly advantageous if the start routine is exited, when the number of signal changes has exceeded a predetermined minimum value. The motor can then be switched over to normal commutation in the operation in the desired rotation direction.

Another solution of the object posed results from a method of operating an electronically commutated direct current motor comprising the following steps:

a) during the rotation of the rotor, a first value (Z_A) is determined for the time (T) that the rotor (11) of the motor (10) takes to rotate between a first and a second predetermined rotor position;

b) a predetermined second value (K1 or K2) is subtracted from this value and the result (Z_A') is temporarily stored;

c) beginning at a predetermined rotor position following the first predetermined rotor position, a time is measured, which is proportional to this result (Z_A');

d) after this time has expired, a commutation process is carried out in the motor.

By this, one succeeds in shifting the rotation angle, at which the stator current is switched on in the motor, more strongly in the early direction as speed increases, i.e. to achieve a so-called "early ignition." In this manner, such an "early ignition" is possible in both rotation directions, and can be optimized for both rotation directions.

BRIEF FIGURE DESCRIPTION

Other details and advantageous improvements of the invention follow from the exemplary embodiment, which is described below, is represented in the drawings, and is in no way to be understood as a limitation of the invention;

Figure 5:
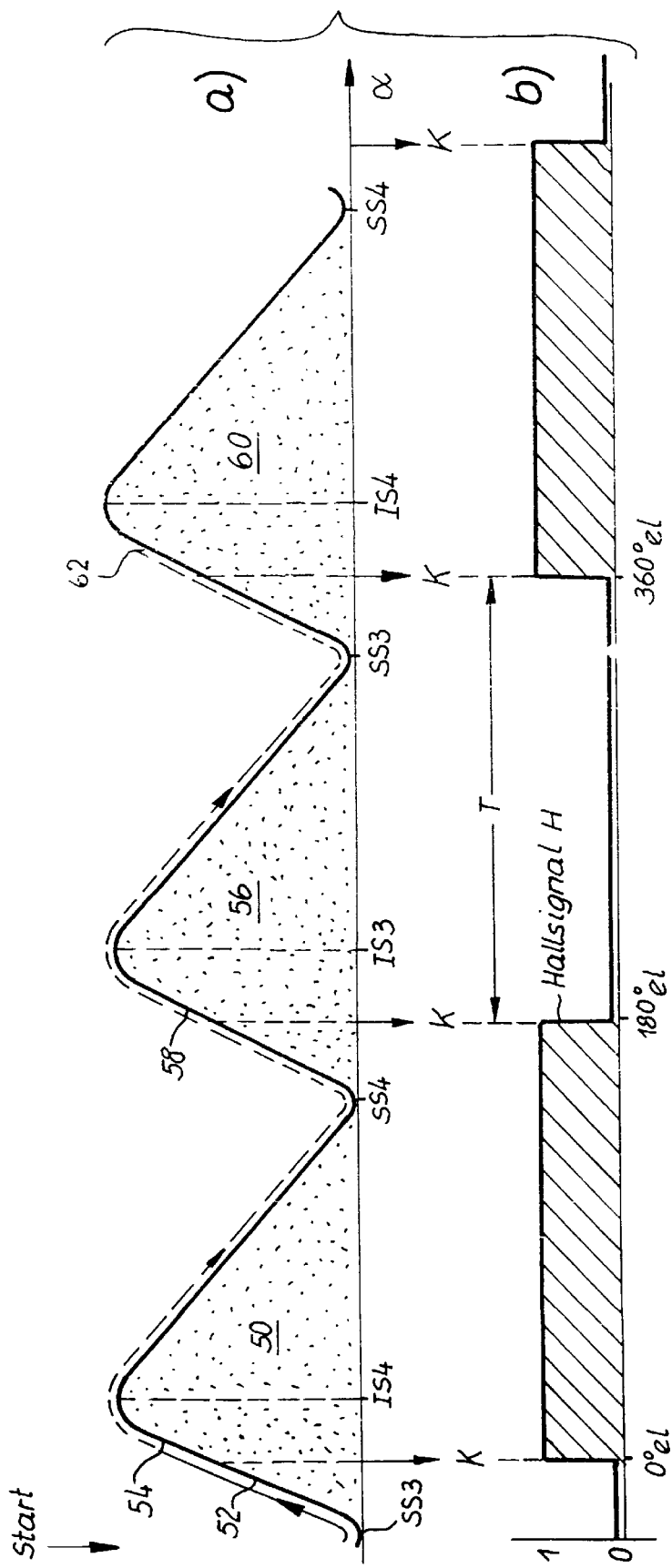
FIG. 5 is a schematic diagram to explain problems that can occur when starting in the reverse direction.
Figure 6:
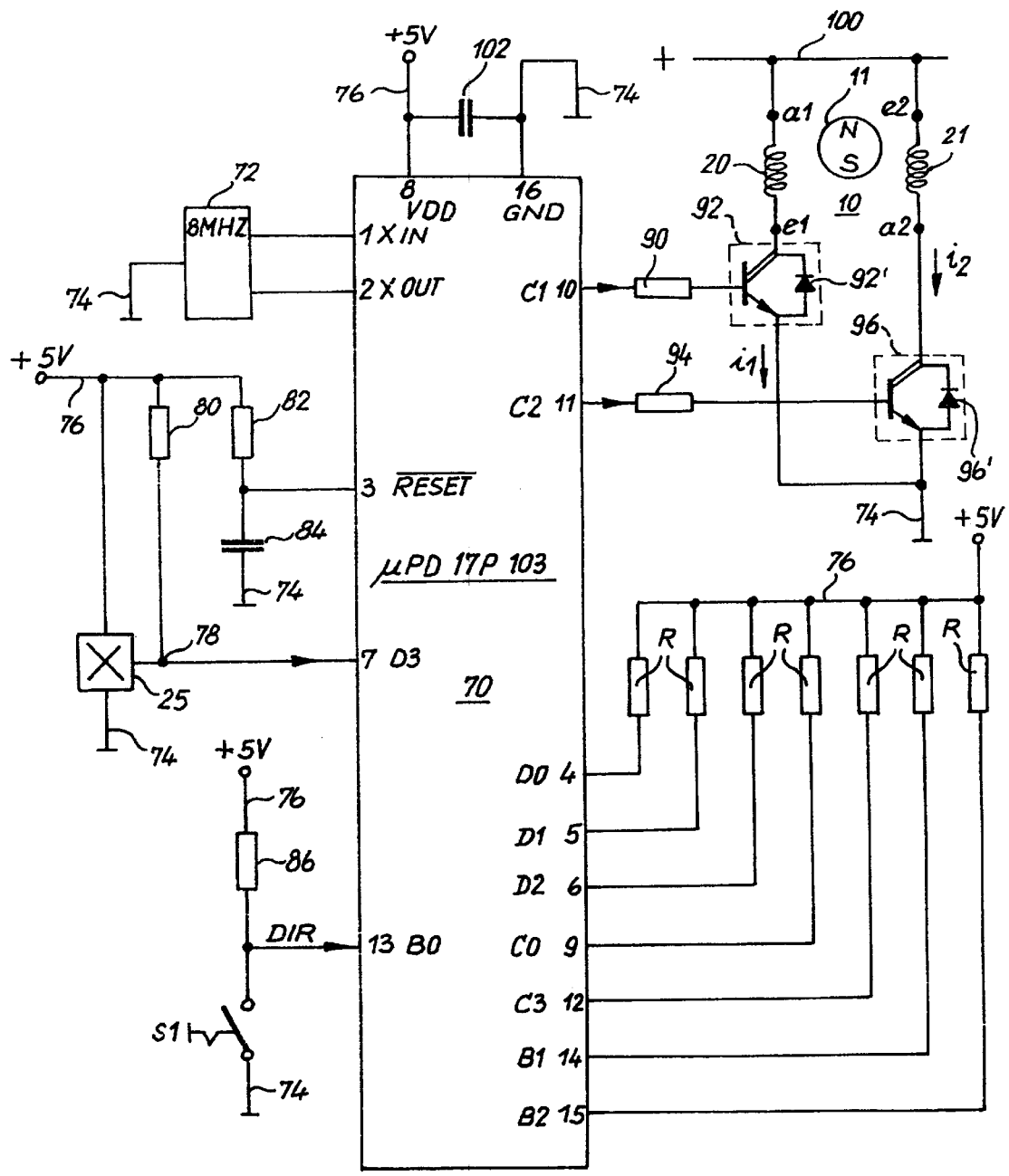
FIG. 6 is a wiring diagram of a circuit for operating a two-pulse motor, e.g. the motor from FIG. 1 or 3.
Figure 11:
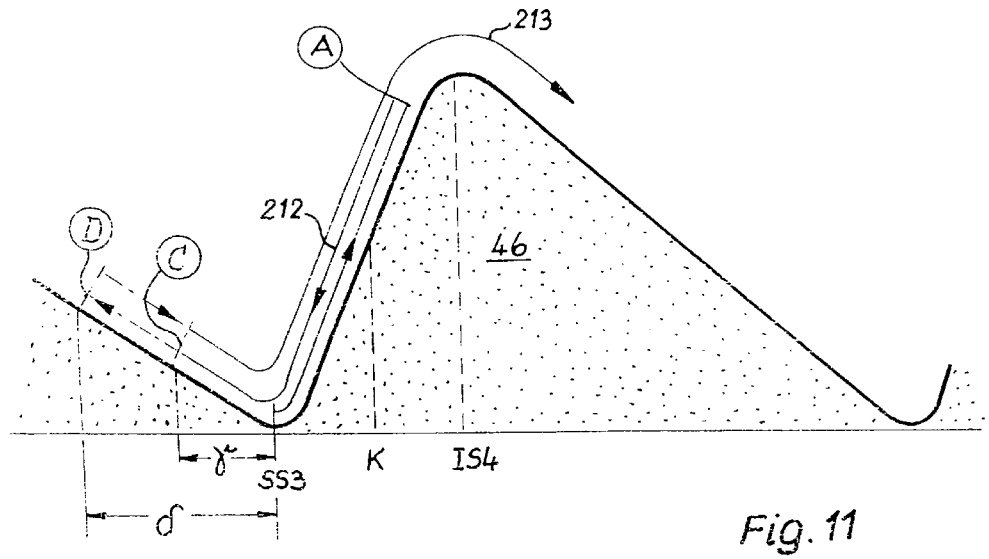
Figure 12:
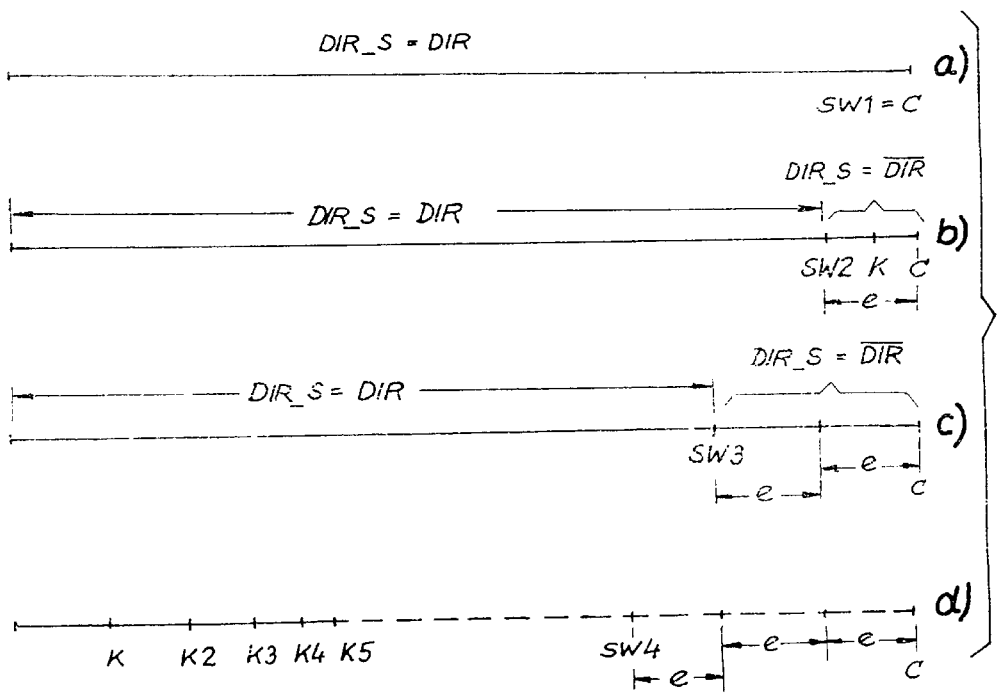
Figure 13:
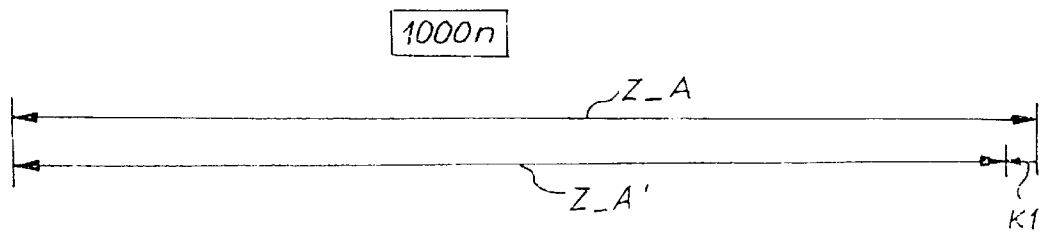
Figure 14:
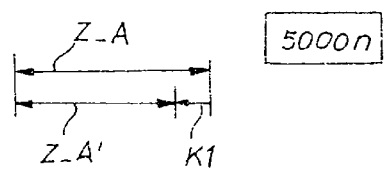
Figure 15:
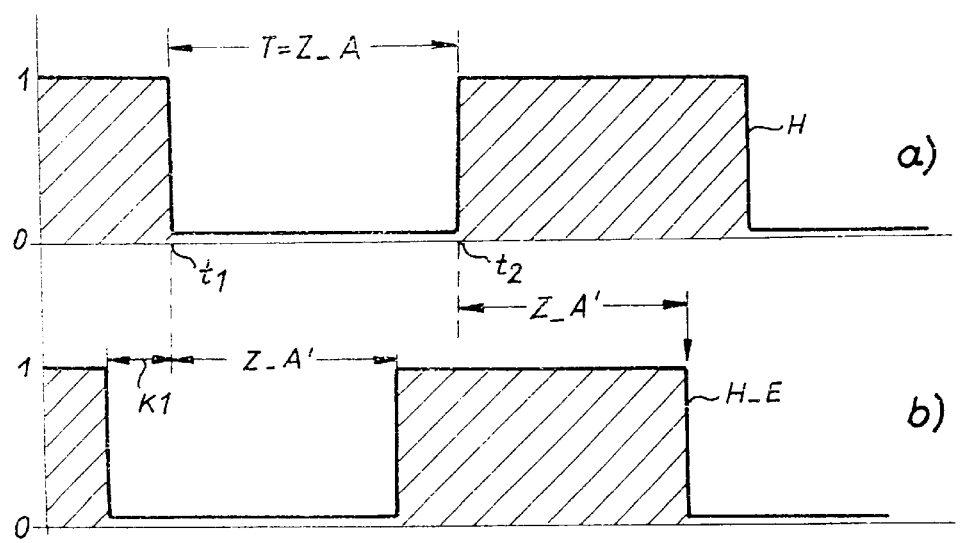
Figure 16:
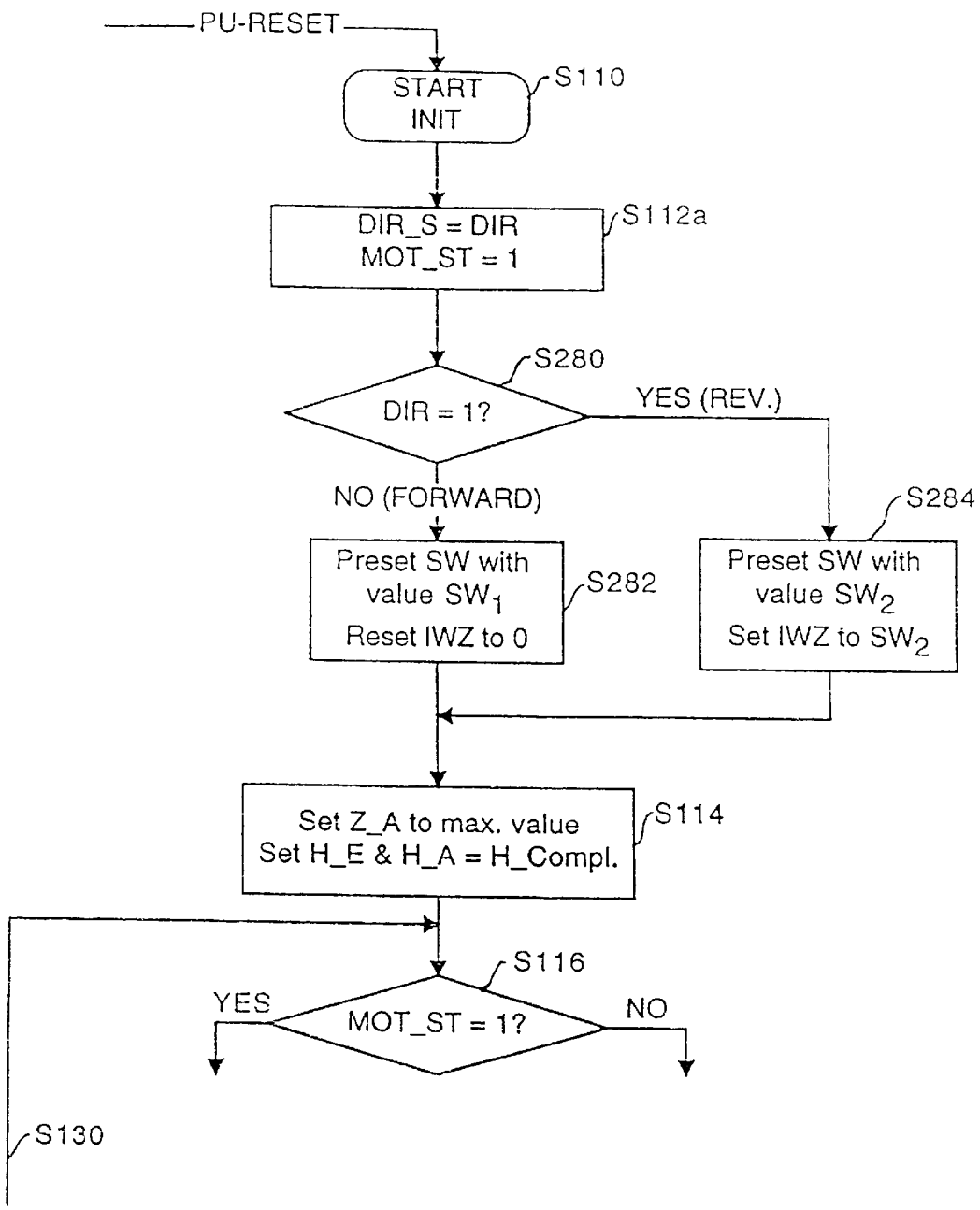
Figure 17:
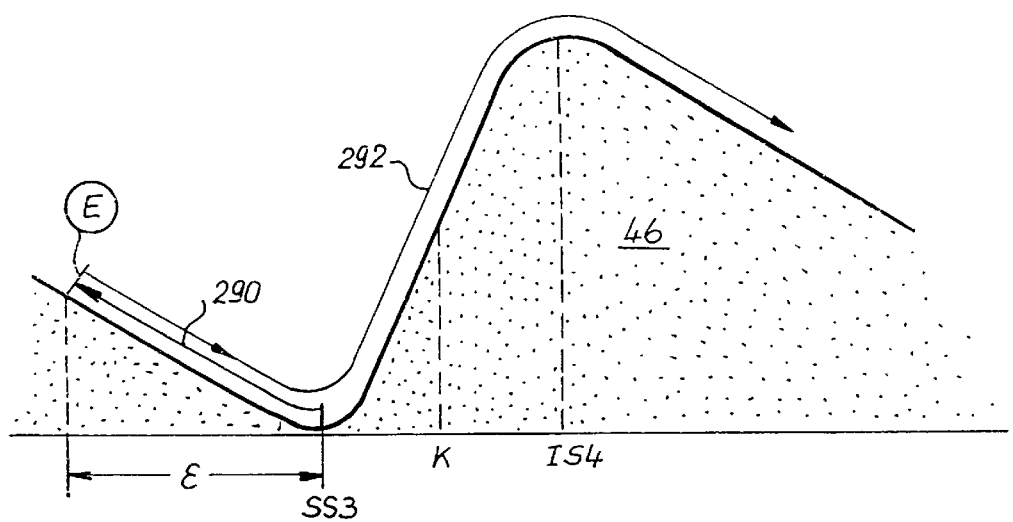

FIG. 11 is a schematic diagram analogous to FIG. 5, which shows the procedures when starting a two-pulse motor, e.g. the motor according to FIG. 6; these procedures are depicted for starting in the reverse direction, but occur in precisely the same manner when starting in the preferred direction, with the difference that when starting in the preferred direction, the startup occurs for the most part directly since a motor of this kind is optimized for the preferred direction;

FIG. 12 is a diagram for explaining a startup with the device from FIG. 6;

FIGS. 13, 14, and 15 are diagrams for explaining the advance angle shift with the device according to FIG. 6;

FIG. 16 shows a variant to the flowchart in FIG. 8, wherein only the differing program steps are depicted; and FIG. 17 is a diagram to explain FIG. 16.

DETAILED DESCRIPTION

The present invention is difficult to understand, and therefore its "physical fundamentals" will be discussed first.

Everyone knows that a car engine can run only in one particular rotation direction. Similarly, there are also electric motors which are optimized for a particular rotation direction and it is either impossible for them to run in the opposite direction or they can only do so with difficulty. Among other things, this is true for the type of electronically commutated motors that are today generally referred to as "two-phase motors" and should be more precisely called two-pulse motors because in them, the stator winding receives two current pulses per rotation of the rotor by 360° el., see the two pulse-shaped torques $T_{el}$ in FIG. 2 below, which are produced by means of corresponding current pulses. For terminology, please refer to the introductory treatise by Dr.-Ing. Rolf Muller in the "asr-digest für angewandte Antriebstechnik" [ASR Digest for Applied Drive Technology] 1977, pp. 27 to 31.

Motors of this kind exist as one-phase motors, e.g. see EP 84 156 B1 and corresponding U.S. Pat. No. 4,535,275, FIGS. 2, 3, and 9, and as two-phase motors, e.g. see DE 30 10 435 C3 and corresponding U.S. Pat. No. 4,374,347. These motors exist as such with a cylindrical air gap, i.e. as internal or external rotor motors, and they exist as motors with a flat air gap, see DE 23 21 022 C2, Müller/Papst Motoren. Within these individual categories, there is an enormous number of sub-variants, which, however, can all be traced back to the fundamental principle that is described extensively by the inventor in the ASR reference. The present invention is suitable in the same way for all of these variants. Since approx. 0.1 billion motors of this kind have been produced (up to this point), a further explanation of examples from patent literature does not appear to be necessary. Today, motors of this kind are found, for example, to drive the fan in practically every computer.

These motors have in common the fact that they only start up reliably in one particular rotation direction, which can be referred to as the "preferred" direction. Endeavors have been made to permit them to start in both rotation directions, e.g. see DE 32 35 774 C2 and corresponding U.S. Pat. No. 3,840,761, but for operation in two rotation directions, electronically commutated motors in three-pulse or four-pulse embodiments are practically always used, see FIGS. 4, 5, and 6 in the ASR reference.

In order to be able to explain the invention, reference will be made below to a two-phase, two-pulse external rotor motor with a cylindrical air gap since the invention is easiest to understand with this kind of motor. However, we emphasize expressly and unmistakably that this is only a comprehension aid and that the invention is suited in the same manner for all two-pulse motors. It would be neither useful nor meaningful to explain the invention for example also in a motor with a flat air gap, as has been disclosed in DE 23 21 022 C2.

Figure 1:
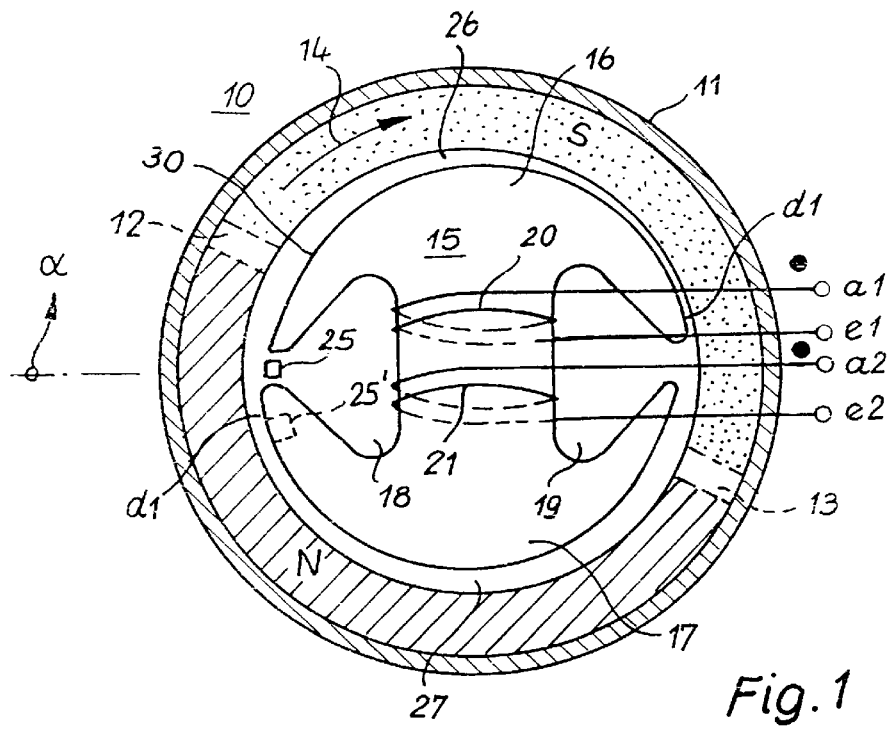
FIG. 1 is a schematic representation of a two-pulse, two-phase external rotor motor with reluctance auxiliary torque.

FIG. 1 shows a typical example for a two-pulse, brushless external rotor motor 10. This has an external rotor 11 with a continuous magnet ring whose magnetization is configured approximately trapezoidal, i.e. the magnetic flux density in the region of the poles is largely constant, and the regions between these poles, which are often called "pole gaps" even though there are in reality usually no gaps there, are narrow.

In FIG. 1 for the sake of clarity, the location with practically constant magnetic flux density for the north pole is indicated with crosshatching and the location with practically constant magnetic flux density for the south pole is indicated with dots. The rotor 11 is formed, for example, as a radially magnetized permanent magnetic part comprised of barium ferrite or a so-called rubber magnet. The two pole gaps are likewise indicated symbolically with 12 and 13.

FIG. 1 shows the rotor 11 in one of its two stable rest positions that it can assume in the currentless state. These rest positions are determined by the form of the air gap and the form of the magnetization. During operation, the rotor 11 normally rotates in the direction of arrow 14. The invention also permits a reliable startup and optimized operation in the opposite direction.

The stator 15 of the motor 10 is formed as a double-T armature with an upper pole 16 and a lower pole 17. Both have approximately the contour form of an umbrella, thus each spans almost the entire pole arc. They enclose between them two slots 18 and 19, and two winding phases 20 and 21 of a two-phase winding are disposed in these slots. The terminals of winding phase 20 are labeled a1 and e1, and the terminals of winding phase 21 are labeled a2 and e2. The windings 20 and 21 have the same winding counts and the same winding direction, i.e. if a direct current flows from a1 to e1, then the same magnetization of the stator 15 is produced as when the same direct current flows from a2 to e2. For the most part the wires of the two windings are wound in parallel, i.e. in the form of a so-called bifilar winding (not shown in FIG. 1).

Sensor means 25 that are dependent on rotor position, in this instance a Hall IC, are disposed on the stator 15 in an angular position that corresponds approximately to the opening of slot 18 (or alternatively slot 19), i.e. the so-called neutral zone. (If the pole gap 12 or 13 is disposed in a position opposite the slot opening 18 or 19, i.e. opposite the sensor 25, then the motor 10 cannot produce an electromagnetic torque, i.e. in this rotational position, it has a gap in its electromagnetically producible torque.)

The Hall IC 25 is controlled by the magnetic field of the permanent magnetic rotor 11 and as a function of the rotor position, it emits a signal that is either high or low, i.e. during rotation of the rotor 11, this signal practically represents a square-wave signal whose high and low sections are each approximately 180° el. long, as shown below in FIG. 5b. (In the motor 10 represented, which has only two rotor poles S and N, mechanical degrees are equal to electrical degrees. In a motor with four rotor poles, 180° mech.=360° el.)

Figure 2:
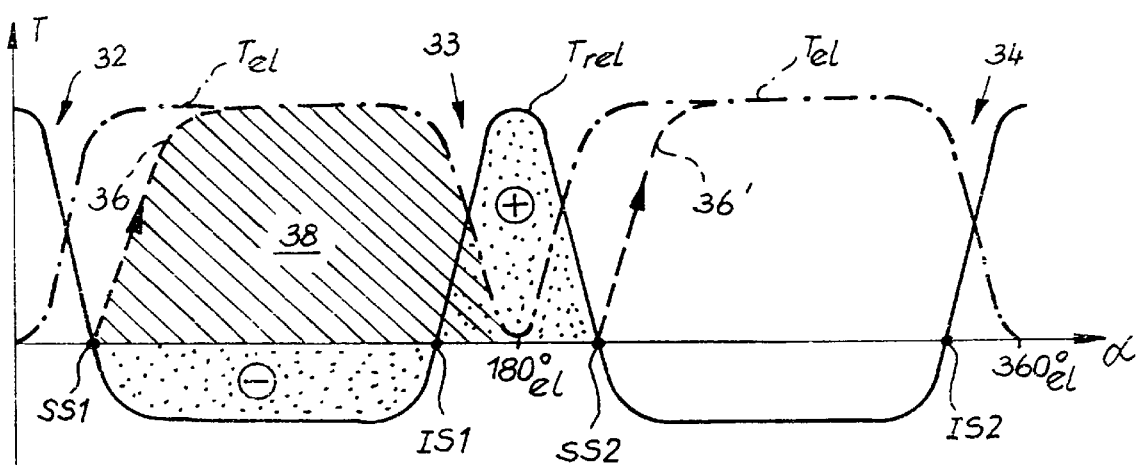
FIG. 2 is a torque diagram to explain the torques that occur during operation of the motor according to FIG. 1, when this motor is running in its preferred direction 14.

The air gap 26 over the stator pole 16 and the air gap 27 over the stator pole 17 are formed in a particular manner. Starting from slot 18, viewed in rotation direction 14, the air gap 26 increases for approx. 10 to 15° el. until reaching a first point 30 at which it reaches its maximum. From there, the air gap 26 decreases over approx. 165 to 170° el. until approximately reaching the opening of the slot 19, where it reaches its minimal value d1. The air gap 27, as shown, has an identical course. This air gap form, in cooperation with the described type of magnetization of the rotor 11, causes the production of a reluctance torque $T_{rel}$ during operation, which is represented in FIG. 2.

The rotor position in which the pole gap 12 is disposed opposite the Hall IC 25, will be assumed to be 0° el., i.e. in this position, the Hall IC 25 changes its output signal when the rotor 11 is rotating. If the rotor 11 is manually turned to this position 0° el. when the motor is without current, then as a result of the reluctance torque $T_{rel}$ that acts in the rotation direction 14, it is rotated further so that the pole gap 12 is disposed approximately opposite the location 30 of the greatest air gap. This location is a stable start position or rest position of the motor and therefore is labeled SS1 in FIG. 2. It is disposed here at approx. 30° el. and in precisely the same manner in this exemplary embodiment, there is a second stable start position or rest position SS2 at approx. 210° el., as shown in FIG. 2, i.e. when the motor 10 is switched off, it automatically rotates into one of these two rest positions.

If the rotor 11 is rotated from one such rest position, in the direction of arrow 14, when the motor is without current, then a torque must be exerted for this, i.e. the reluctance torque $T_{rel}$ has a braking effect, until approximately reaching the point d1 with the smallest air gap, where $T_{rel}$ becomes zero. The rotor 11 can occasionally remain in this position, which is disposed at approx. 155° el. or 335° el. and this (unstable) position can therefore be referred to as unstable rest position IS1 or IS2, respectively.

If the rotor 11 is manually rotated slightly in the direction of arrow 14 starting from IS1, then it is rotated further by means of strong driving $T_{rel}$ until reaching position SS2.

There is, therefore, a braking $T_{rel}$ of relatively low amplitude between SS1 and IS1 and a driving $T_{rel}$ of high amplitude between IS1 and SS2.

The Hall IC 25 controls the current in the two phases or strands 20 and 21 so that between 0° el. and 180° el., a driving electromagnetic torque $T_{el}$ is produced, which has a gap 32 or 33, respectively, in the regions of 0° el. and 180° el. and so that a driving electromagnetic torque $T_{el}$, is likewise produced between 180° and 360° el., which has a gap 33 and 34, respectively, at 180° el. and 360° el. These gaps 32, 33, 34 are filled by the positive part of $T_{rel}$. This is therefore indicated by a plus sign.

At the start in one of the positions SS1 or SS2, the driving $T_{el}$ is generated in accordance with a curve 36 or 36', i.e. when starting from position SS1, while in the region 38 that is crosshatched in FIG. 2, a forceful torque $T_{el}$ comes into play, which reliably accelerates the motor 10 and causes it to start. This reliable starting is a significant advantage of this version, but only applies for the rotation direction 14, i.e. the preferred direction.

As a comprehension aid, this can be explained such that the pole gap 12 (or 13) always seeks the position with the greatest air gap 26 or 27, e.g. the position 30.

If the pole gap 12 is rotated out of the position 30 in the direction of arrow 14, then the air gap 27 under it becomes smaller, i.e. it must climb uphill, so to speak, but at a slight incline, which is why starting up in this direction can be achieved with no trouble.

Figure 3:
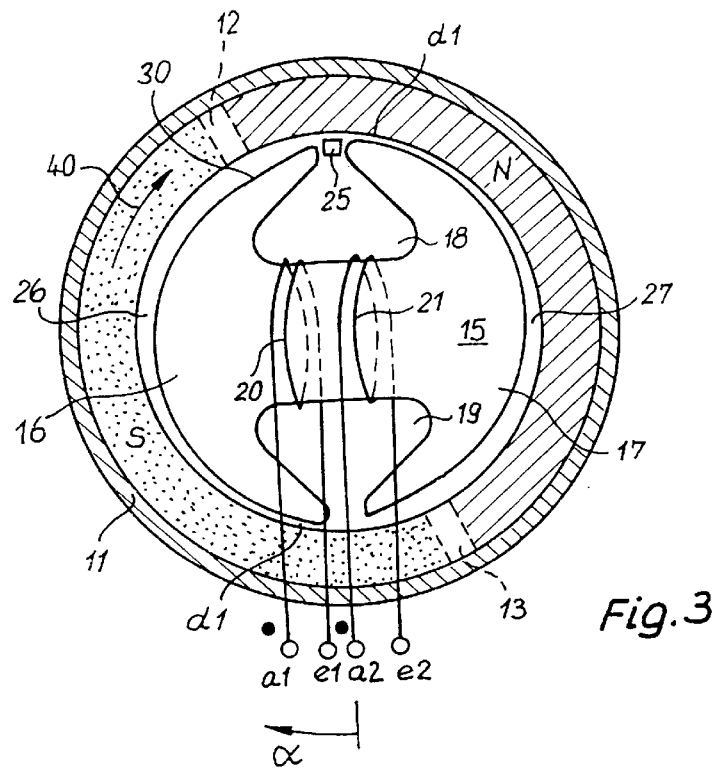
FIG. 3 is a depiction analogous to FIG. 1, but for the case in which this motor is running in the reverse direction 40.

However, this does not apply to starting in the reverse direction, which will be explained below in conjunction with FIGS. 3 and 4. These show the instance in which the startup occurs in the reverse direction 40. In contrast to FIG. 1, in this instance the rotation angle 0° el. is assumed when the pole gap 12 is disposed opposite the slot 19, as shown in FIG. 3.

The electromagnetic torque $T_{el}$ agrees with FIGS. 1 and 2, but the reluctance torque $T_{rel}$ now has a totally unfavorable form, i.e. the stable rest position SS3 is disposed at approx. 150° el., SS4 is disposed at approx. 330° el., and the unstable rest positions IS3 and IS4 are respectively disposed at 30° el. and 210° el.

Figure 4:
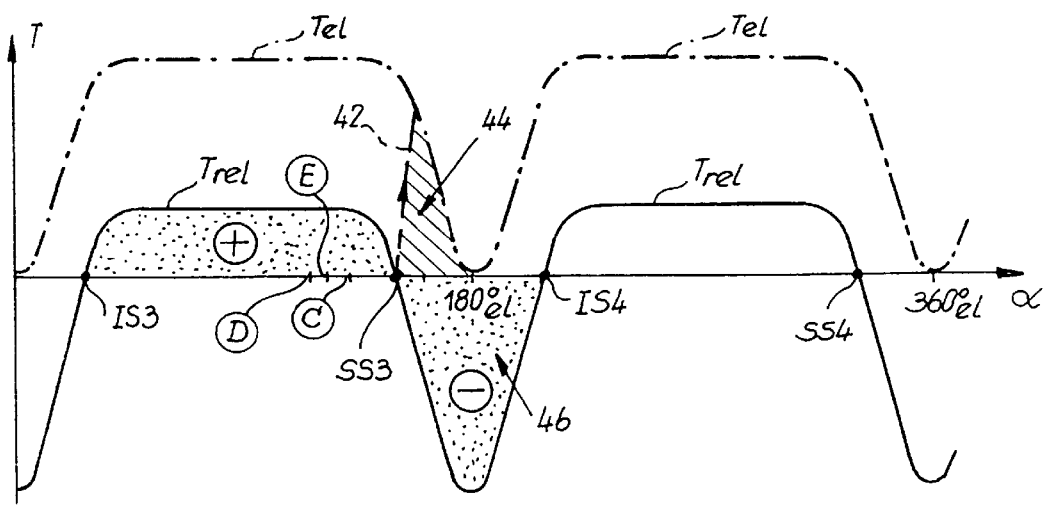
FIG. 4 is a torque diagram to explain the torques that occur during operation of the motor according to FIG. 3, if this motor starts running in the reverse direction.

In this instance, the motor 10 must start from SS3 or SS4, i.e. when starting from SS3, an increase of $T_{el}$ according to line 42 is obtained, and this driving torque comes into play only during the short region which is crosshatched in FIG. 4 and labeled 44. As can be seen, this energy quantity 44 is normally insufficient to overcome the braking part 46 of $T_{rel}$, disposed between SS3 and IS4 and indicated with a minus sign, i.e. the motor 10 cannot start up in this direction 40 or it will only start up sometimes, but often only will jerk once in the rotation direction 40 and then remain stationary, while a high current flows through its stator winding.

The reader should also know that in the region around 0° el., 180° el., etc. in these motors, it is not possible to produce an electromagnetic torque $T_{el}$, i.e. there is always a torque gap of $T_{el}$ at these points, whose width primarily depends on the form of the magnetization of the rotor magnet 11.

As a further comprehension aid, in FIG. 5a, the reluctance torque is shown as a landscape with hills and valleys.

If the motor starts from the position SS3 (see FIG. 4), then it may happen be the case that it only makes it halfway up the first hill 50, i.e. it comes to a standstill at position 52 and from there, goes neither forward nor backward; no commutation signal K having been generated yet.

It may also happen that the motor makes it to position 54, whereby a signal K is generated, i.e. a commutation occurs, but a startup is likewise not possible.

It may also happen that the rotor makes it over the first hill 50 and to the point 58 on the second hill 56, whereby two commutation signals K are then generated and the motor subsequently remains stuck, at point 58.

It may also happen that the motor also makes it over hill 56 to hill 60 and then remains stuck there at point 62, whereby it generates a total of three commutation signals K.

Experience shows that after climbing over five hills 50, 56, 60, etc., i.e. over five braking portions 46 of $T_{rel}$. the motor reliably starts up in the reverse direction, and therefore the fact that more than four commutation signals K are generated, one after the other, when driving the motor in the desired rotation direction is used as a criterion for a continuous rotation in the desired rotation direction, i.e. for a reliable start.

FIG. 6 shows the structure of the circuit used to operate the motor 10. It should be stressed once again that this motor is only an example, since without such a concrete example, the invention would be difficult to understand. The invention is suited in the same manner for every two-pulse motor, e.g. for a motor with a flat air gap as represented in DE 23 21 022 C2 and corresponding U.S. Pat. No. 3,840,761 or for an internal rotor motor, or for a two-pulse motor in which the sole phase or strand is supplied with current by way of a full bridge circuit. It goes without saying that within the scope of a single patent application, one can only mention all of these variants, but cannot explain all of them in terms of exemplary embodiments.

The circuit according to FIG. 6 uses, as an example, a 4-bit microprocessor 70 with a RESET input 3. The microprocessor 17P103, (manufacturer: NEC), is shown, but the invention is suitable in the same manner for every other microprocessor or microcontroller. The desigations of the terminals of the aforementioned microprocessor are disclosed in FIG. 6 and are therefore not repeated in the text. This microprocessor contains various internal registers, a RAM, and a ROM, and the program, explained below, for controlling the motor 10, is contained in the ROM.

An 8 MHz ceramic resonator 72 is connected to the inputs 1 and 2 of the microprocessor 70 and this resonator is used as a clock generator for the microprocessor 70 and defines its operating frequency. This frequency also defines how much time is required to pass through one of the program loops S130 described below.

With its negative connection to a minus line (GND) 74, and with its positive connection to a plus line 76, the Hall IC 25 is connected to a regulated direct current of +5V, for example. Its output 78 is connected to the port D3 (input 3) of the microprocessor 70, and is also connected via a pull-up resistor 80 (e.g. 10 k) to the plus line 76 (Hall IC 74 with open-collector output; k=kΩ).

The reset input 3 (/RESET) is connected to the plus line 76 via a resistor 82 (e.g. 100 k) and to the minus line 74 via a capacitor 84 (e.g. 2.2 µF).

When the motor is switched on, the capacitor 84 is discharged so that the signal LOW is present at the reset input and this signal is recognized as power-up reset (PU reset), i.e. in this instance, the microprocessor 70 executes particular initialization procedures, which will be described below in conjunction with program steps S112 or 112a and S114. Next, the capacitor 84 is charged via the resistor 82, and after the charging, the microprocessor 70 then detects the potential HIGH at input 3 and unblocks the startup of the motor 10.

In the manner shown, a switch S1 is connected to port B0 (input 13) and the user employs this switch to determine the rotation direction of the motor 10. This switch is disposed between the input 13 and the minus line 74, while a resistor 86 (e.g. 10 k) is disposed between the input 13 and the plus line 76. If the switch S1 is closed, then the potential LOW, which is often also referred to as "0", is present at port B0, and this potential corresponds to a particular rotation direction. If S1 is open, then port B0 has the potential HIGH, which is often also referred to as "1", and this potential corresponds to the opposite rotation direction. The signal at the port B0 is labelled DIR and determines the rotation direction. The signal DIR can be generated in any arbitrary manner, e.g. by any arbitrary electronic circuit which controls the running of the motor 10.

The ports D0, D1, D2, C0, C3, B1, and B2 are connected via identical resistors R (e.g. 47 k) to the plus line 76. These are free ports which have no function within the scope of the current invention and therefore are set to a definite potential so that they will cause interference.

The ports C1 and C2 control the commutation of the motor 10. The port C1 is connected via a resistor 90 (e.g. 4.7 k) to an n-p-n Darlington transistor 92, which contains a recovery diode 92'. The port C2 is likewise connected via a resistor 94 (e.g. 4.7 k) to an n-p-n Darlington transistor 96, which contains a recovery diode 96'. The collector of transistor 92 is connected to the terminal e1 of winding phase 20, and the collector of transistor 96 is connected to the terminal a2 of winding phase 21. The terminals a1, e2 (see FIG. 1) are connected to a plus line 100, in which a potential, for example, of +12V, +24V, +48V, +60V, or the like can be present, i.e. the operating voltage of the motor 10. The winding strands 20, 21 are preferably wound with parallel wires, i.e. as a so-called "bifilar winding". The emitters of the two transistors 92 and 96 are connected to the minus line 74. The transistors 92, 96 are switched on alternately by the microprocessor 70, but never at the same time.

The input 8 of the microprocessor 70 is connected to the plus line 76 and the input 16 is connected to the minus line 74, i.e. to ground. A capacitor 102 (e.g. 33 nF) is disposed between the inputs 8 and 16, and should prevent interference pulses from reaching the microprocessor 70 via the input 8.

Figure 7:
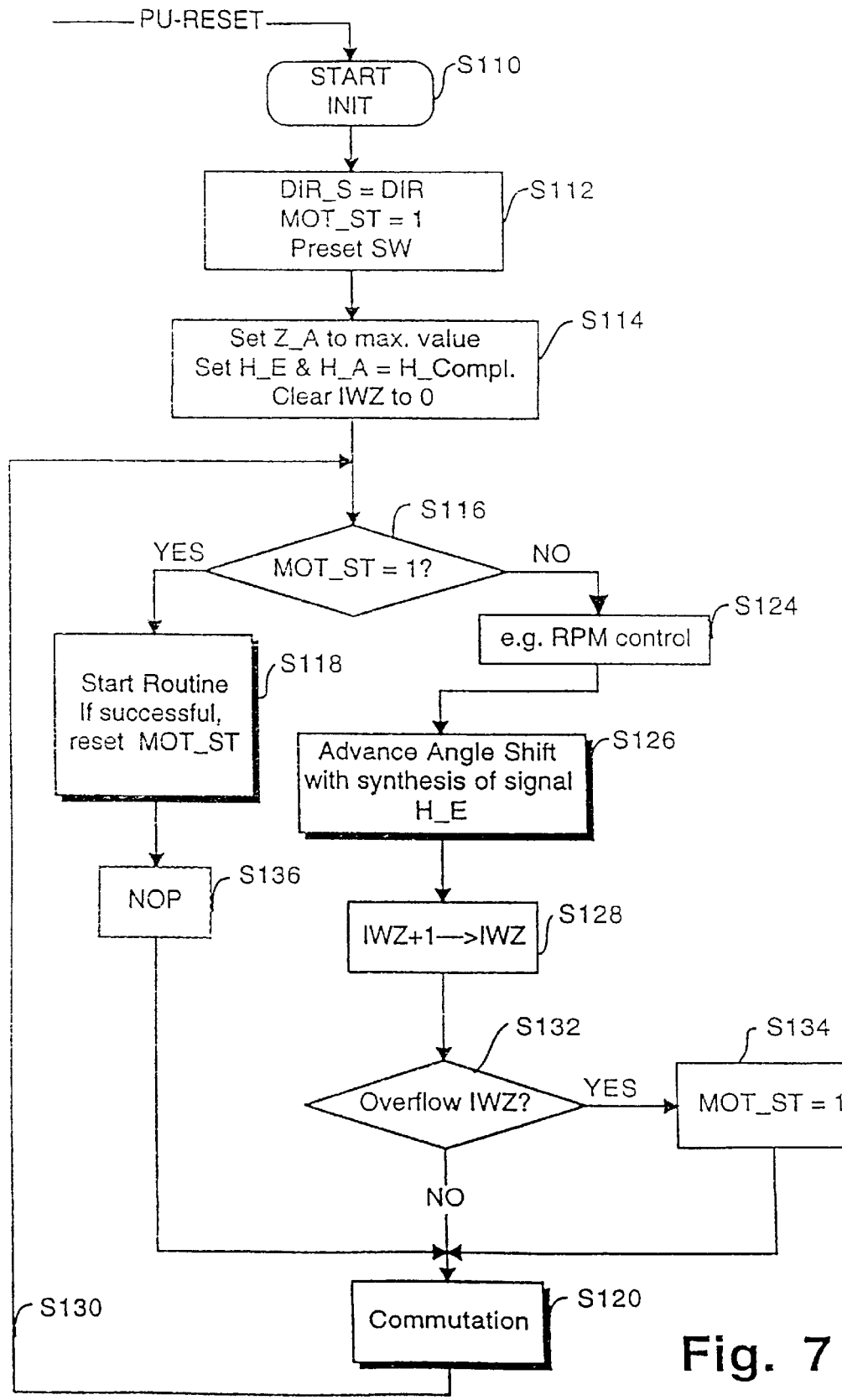
FIG. 7 is an overview flowchart which shows the chronological execution of the motor control with the circuit according to FIG. 6.

FIG. 7 shows the fundamental structure of the program, which is stored in the ROM of microprocessor 70. As a preface to the program according to FIGS. 7 to 10, it should be said that this program is for operating the motor in both rotation directions. It has the same structure—except for small differences, e.g. in steps S258, 260, 262—for both rotation directions, i.e. the program has a symmetrical structure. As described below in conjunction with FIGS. 16 and 17, an asymmetrical structure is also possible and can facilitate a more rapid start.

Since the motor will start with no trouble in the preferred direction 14, the first step in this program is a start attempt in the rotation direction set by signal DIR (switch S1). This first start attempt, though, is typically unsuccessful when starting in the reverse direction 40, i.e. the motor will not start or will only do so sporadically, and this step can therefore be omitted when starting in the reverse direction, as shown in the variant according to FIGS. 16 and 17; however, there is also no harm in it, so that for reasons of uniformity of the program structure for both rotation directions, this step can also be executed when starting in the reverse direction 40, which only delays the starting process in the reverse direction 40 by a few milliseconds. On the other hand, this step has the advantage of moving the rotor 11 of the motor 10 slightly, which, for example, slightly reduces the bearing friction of slide bearings, and will make the subsequent steps of the startup occur with greater ease.

The purpose of the program's execution—when starting in the reverse direction 40—is to bring the rotor from its stable rest position (SS3 or SS4 in FIG. 4) into a position which is disposed in FIG. 4 somewhere between IS3 and SS3 or between IS4 and SS4, e.g. in one of the positions which are labeled in FIG. 4 with C, D, and E. If the rotor starts from position D, then it is driven by the driving reluctance torque $T_{rel}$ during approx. 30° el. and it is driven by the driving electromagnetic torque $T_{el}$ for approx. 50° el. so that it can build up enough momentum in order to then overcome the negative, braking part 46 of the reluctance torque $T_{rel}$ and start up.

If the motor should by chance be disposed in one of the unstable start positions IS3 or IS4 before being started in the reverse direction 40, then the startup represents no problem already at the first attempt since the starting conditions are optimal then.

Therefore, when starting in the reverse direction 40, the motor is first brought from its stable rest position (SS3 or SS4) into a more favorable start position, which occurs by virtue of the fact that the rotor is rotated back and forth in very rapid succession by the program, which can be referred to as a forced oscillation. If in so doing, the motor 10 does not start immediately, the amplitudes of the forced oscillation are preferably increased with each new attempt. If a hand is placed on the starting rotor, its vibrations can be felt, which are produced by the rapidly alternating forced rotations in different directions.

There are various promising strategies for implementing this fundamental concept. The program structure described below permits an extremely reliable start in both rotation directions, as has been shown in extensive trials in the laboratories of the applicant. This program structure therefore represents a preferred exemplary embodiment of the invention, but naturally not the only possible embodiment.

The following abbreviations are used in the flowcharts below:

DIR . . . direction signal at port B0.

H_S . . . register for control purposes within the program

MOT_ST . . . register which is set when the motor starts and which indicates that the program is disposed in its start routine.

H . . . Hall signal, as depicted in FIG. 5b, for example. In lieu of a Hall sensor 25, any other rotor position sensor can be used, e.g. even a mechanical switch or a commutation in accordance with the so-called sensorless principle.

DIR_S . . . register for the direction signal.

H_A . . . internally stored value for the last Hall signal H measured.

H_E . . . internally stored value for a synthetic commutation signal, with which the motor 10 is actually commutated and which is phase shifted in relation to the Signal H, particularly at high speeds, see FIG. 15a (signal H) and FIG. 15b (signal H_E), which are phase shifted in relation to each other.

H_E_S . . . register whose content is used for producing H_E. The content of this register can be influenced during a number of passes through the loop S130, see steps S250, S252, S268 below. Only when this content is fixed is it taken into H_E at a time determined by the program (see steps S232, 238, and S268 below), in order to optimally control the commutation of the motor.

SW . . . threshold value

This threshold value can assume different values $SW_n$, e.g. $SW_1$ to $SW_{14}$, which during start up can, if necessary, be cyclically run through until the motor starts.

IWZ . . . actual value counter

This measures the time interval T between two signal changes K (FIG. 5). This time is a measure for the actual value of the speed, i.e. the actual speed value. This time interval T decreases with increasing speed.

Z_A . . . register which temporarily stores the value detected in the IWZ in the preceding measurement.

ALZ . . . startup counter. This counts the number of signal changes K of the signal H (FIG. 5) when starting. The counting is only carried out under particular conditions, namely only when DIR_S=DIR.

C . . . constant

K1 . . . constant for the advance angle shift when running forward 14.

K2 . . . constant for the advance angle shift when operating in reverse 40.

In FIG. 7, the program—in this instance, after a PU reset (which has been described in conjunction with FIG. 6)—proceeds to a step Silo in which the microprocessor 70 is initialized. This is used for the definition of variables and constants, which have to be predetermined for the execution of the subsequent program.

In step S112, the first part of the initialization occurs. In this instance, the signal DIR (at port BO) is loaded into the register DIR_S, which contains the direction-indicating bit with which the commutation operates. This is useful because the startup control can begin immediately with the start in the right direction.

Furthermore, in S112, the register MOT_ST ("motor stopped") is set so that after a PU reset, the start routine can begin immediately. In addition, the (variable) threshold value SW is preset with a constant value, e.g. a value $SW_1$=400 ms; in this instance, this time can be preset in internal time units of the system, i.e. not in milliseconds, but e.g. in units of 80 µs.

In step S114, the register Z_A ("counter old") is set to its maximal value so that the setting of the so-called advance angle can operate correctly. The terms "advance angle" and "advance angle shift" will be explained below in conjunction with FIG. 10.

In addition, the value H is polled i.e. the rotor position signal from sensor 25, and its complementary value H_Kompl. are produced. The registers H_E and H_A are set to this complementary value. This simulates a commutation K, i.e. a change of the signal H, so that the shifting of the advance angle can work immediately. Furthermore, the counter IWZ is reset to 0.

Next, the program proceeds to step S116, which is already a part of the main program. There, the register MOT_ST is polled. If it is set (see S112), then the program proceeds to step S118, i.e. the start routine or startup control, which will be described below in conjunction with FIGS. 8A and 8B. In this instance, the program then proceeds directly to step S120, i.e. the commutation, which will be described below in conjunction with FIG. 9, wherein if need be, one or a number of NO-OP commands S136 can be provided, whose function will be explained below.

If the startup routine (S118) is successful, i.e. the motor 10 starts up, then the register MOT_ST is reset, i.e. MOT_ST=0, so that when the program is run through next, it will pass through the right branch of FIG. 7.

The right branch of FIG. 7 may contain a speed or RPM controller in S124 (this is the subject of German Patent Application 195 45 109.0 dated Dec. 4, 1995), but in many instances, no speed control is required and this step is then omitted.

In step S126, the advance angle shift is carried out, which will be explained below in conjunction with FIG. 10. This produces the synthetic signal H_E ("Hall replace"), with which the commutation of the motor 10 will operate at higher speeds. Depending on rotation direction, HBE can be produced according to different rules, as explained below.

In step S128, the counter IWZ is increased by the value 1, i.e. the number of passes through the program loop S130 is counted in IWZ.

In step S132, a test is made as to whether there is an overflow of the counter IWZ. Such an overflow means that the motor 10 is not rotating (any more), because as described above, the IWZ measures the time interval T (FIG. 5) between two changes K of the signal H, and in step S126, the counter IWZ is reset to zero (reset of this counter) at each signal change K, see step S256 in FIG. 10. Therefore, if an overflow is detected in step S132, then the register MOT_ST is set again in step S134 in order to reactivate the startup routine (S118).

In step S120, the commutation (FIG. 9) takes place, controlled by the signals H_E. Then the program returns to step S116 via the loop S130, i.e. it is an endless loop which, if need be, is interrupted by means of cyclical reset procedures; in this connection, see European Patent Application 94 118 728.8.

The passage through a complete loop S130 advantageously takes a constant time, which if need be, is achieved by means of NO-OP commands, one of which is symbolically indicated at S136. These are inert commands, which only take up time, but have no effect so that the passage through the loop S130 via the left branch of FIG. 7 takes just as long as the passage through the right branch, e.g. in both cases 80 µs. This permits a time measurement by means of counting the number of passes through the loop in the counter IWZ. In this manner, the actual value of the speed of the motor can be measured very easily and without additional measures. In actual use, it is of primary importance that the passage through the right part of FIG. 7, no matter which path, always takes the same amount of time, whereas this is desirable in the start routine S118, but is less important.

Figure 8A:
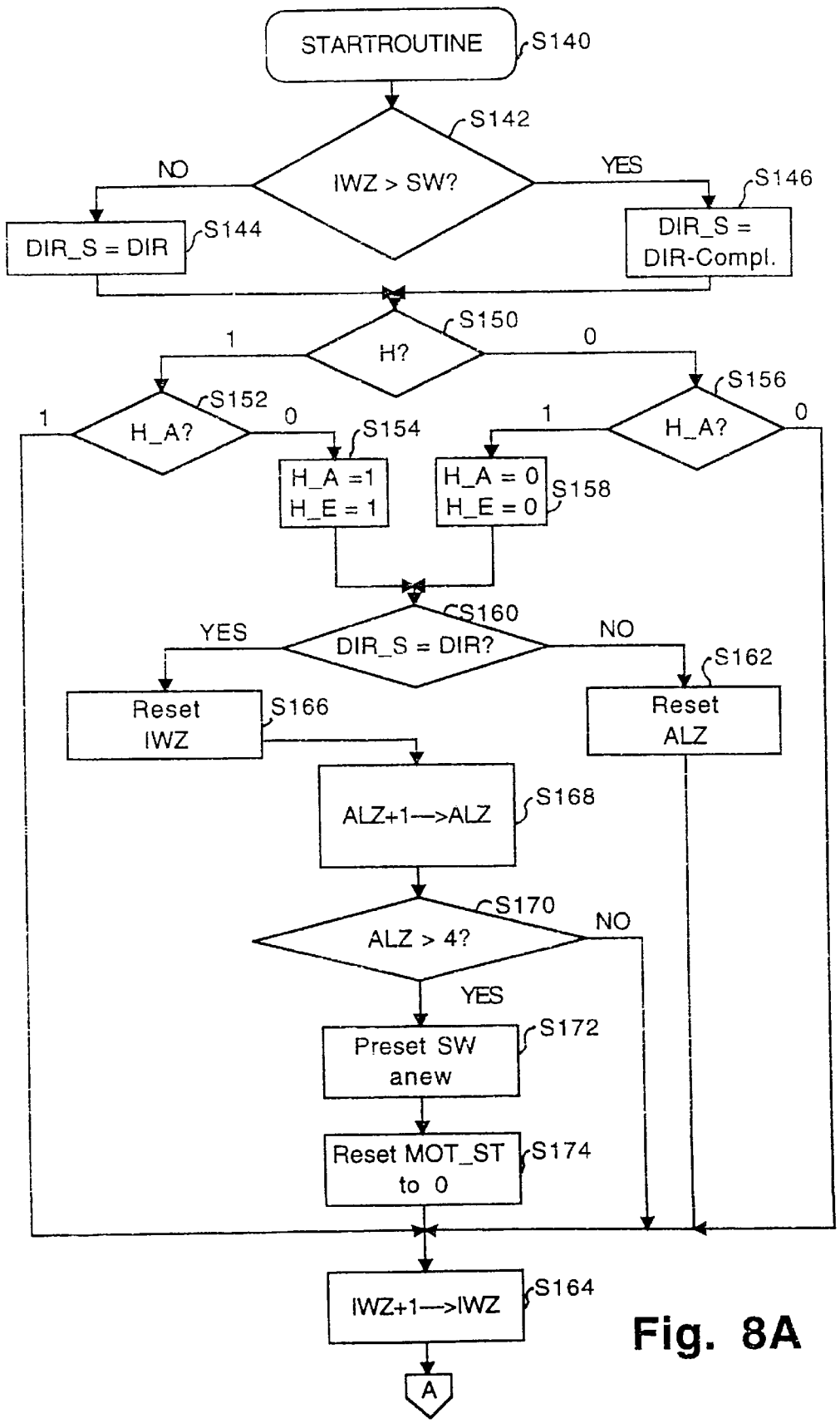
FIGS. 8A and 8B are a flowchart which shows the execution of the startup procedure with the motor according to FIG. 6.
Figure 8B:
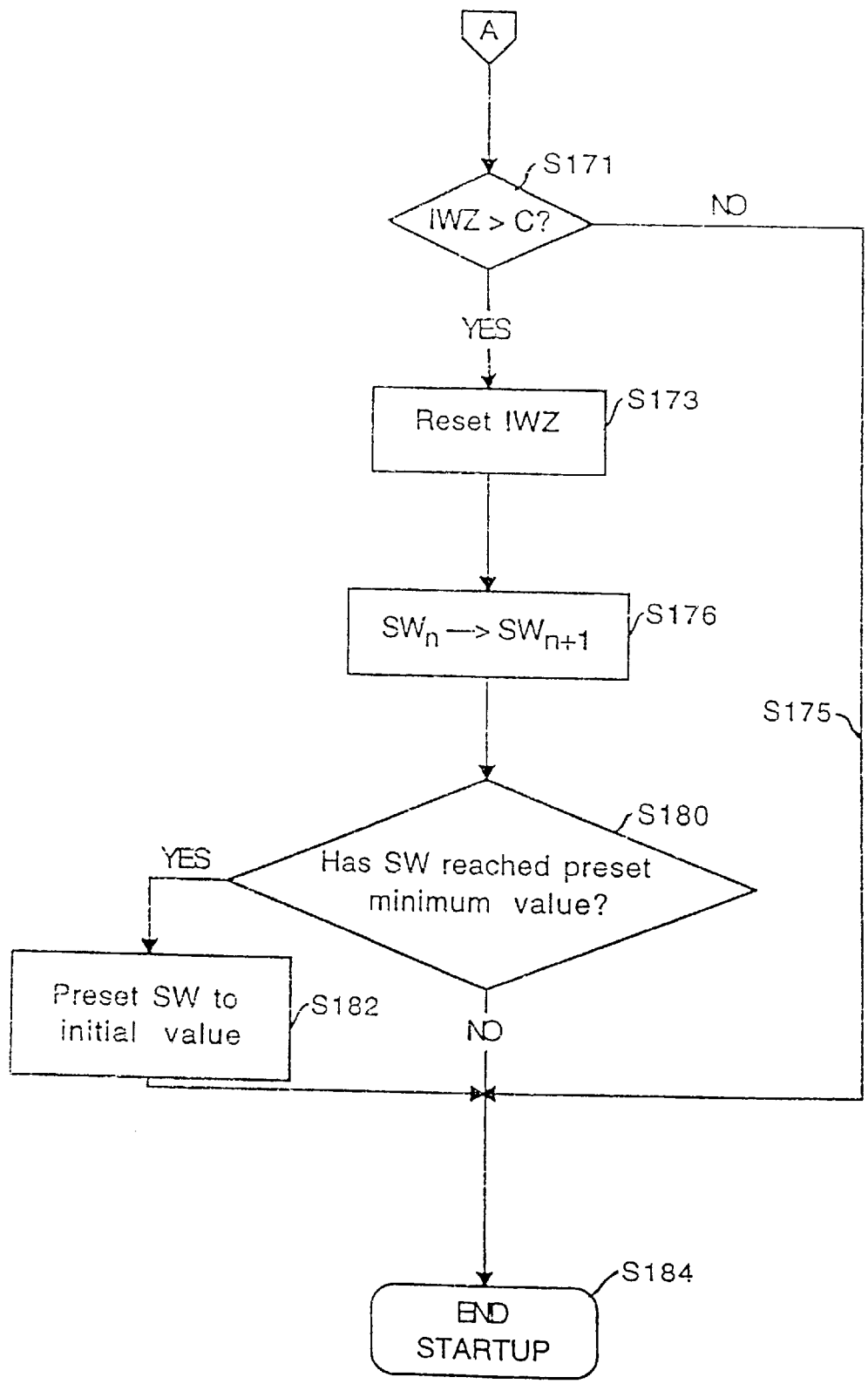

FIGS. 8A and 8B together show the startup control (start routine) according to step S118 of FIG. 7. As explained in FIGS. 3 to 5, a reliable startup in the reverse direction was not previously possible with two-pulse motors because motors of this kind, no matter what type, are optimized for starting in their preferred direction. The start routine according to FIG. 8 permits a reliable start in both rotation directions.

Step S140 is the point of entry from the main program, i.e. after step S116 in FIG. 7. First, a test is carried out in S142 as to whether IWZ is greater than the (previously preset) variable SW. If this is not the case, then in S144, DIR_S is set equal to DIR, i.e. the signal DIR at port B0 (FIG. 6) determines the rotation direction for which the motor 10 (in step S120) is receiving current, so that a torque is produced in this predetermined direction by virtue of the fact that the relevant winding phase 20 or 21 of motor 10 receives a current $i_1$ or $i_2$ (FIG. 6), as explained below in conjunction with FIG. 9. As a result, the motor 10 receives an electromagnetic torque $T_{el}$ in the desired rotation direction, which was preset or prespecified at port B0 of microprocessor 70 (FIG. 6).

If IWZ is greater than the variable SW (step S146), which in actual use means that the motor is not rotating, then DIR_S assumes the complementary value of the signal DIR at the port B0, i.e. if, for example, B0="1", then DIR_S is set to "0" in step S146. This means that the motor (in step S120) is receiving current for a rotation counter to the desired rotation direction, set at port B0. The logic of this measure, namely the production of a controlled forced oscillation of the rotor 11 in the region about its current rest position, will be explained below in conjunction with FIGS. 11 and 12.

In step S150, the signal H is polled or sampled (after S144 or S146), which is represented in FIG. 5b, i.e. the (actual) output signal of Hall IC 25. If this is HIGH, then S152 follows, in which H_A is polled i.e. the old value of H, which is preset in S114 during the initialization, i.e. before the start, and which is refreshed (updated) with each change of the signal H.

If H=1 and H_A=0, then this means that a signal change K (FIG. 5) has occurred, and in step S154, therefore, H_A is updated to the new value "1", as is H_E, since during starting, the values of H_A and H_E are equal. The registers H_A and H_E assure that a change of the signal H is reacted to only once, which change (when starting) signifies a commutation K, as explained below in conjunction with FIG. 9.

In a completely analogous manner, when H=0, a test is made in step S156 as to whether the signal H has changed from "1" to "0", and if this is the case, in step S158, the register H_A is set to "0", as is H_E. The steps S150, 152, 156 are structured as a binary tree, and serve to detect a signal change K during the starting of the motor. The signals H_A and H_E remain stored until the next change.

If the result of step S152 is "1" or the result of step S156 is "0", then the program proceeds directly to step S164, which will be explained below.

After the steps S154, S158, a test is made in S160 as to whether the register DIR_S has the value of DIR, for this, see steps S144 and 146. As a reminder, DIR_S=DIR means that the motor 10 is currently attempting to start in the desired rotation direction, i.e. is receiving a corresponding current in winding phase 20 or 21. DIR_S≠DIR (S146) means that the motor 10 is receiving current for a rotation direction counter to the desired rotation direction and therefore at this moment is being driven in the "wrong" rotation direction.

If DIR_S≠DIR, i.e. the motor is being driven in the "wrong" rotation direction, then the start attempt cannot have been successful and therefore in step S162, the startup counter ALZ is reset to 0. (This counter counts the signal changes K represented in FIG. 5, but only on condition that DIR_S=DIR is constant, i.e. only if the motor continuously receives current for the rotation in the desired rotation direction. Every time that the motor receives current for a rotation counter to the desired rotation direction in order to produce a forced oscillation, ALZ is reset to 0.) After S162, the program then jumps directly to step S164, in which IWZ is increased by 1.

If the register DIR_S has the same content as the signal DIR at port B0, then the program proceeds to step S166 in which IWZ is reset to 0, i.e. a change K of the Hall signal H has occurred and therefore according to FIG. 5b, the measurement of the time interval T has ended and a new one begins with the signal change K, i.e. when IWZ=0. (During the start routine, a signal change K corresponds to a commutation of the motor current in step S120.)

After this, the startup counter ALZ is increased by the value 1 in step S168. For this, please refer to FIG. 5, which shows the start in the reverse direction 40. If the rotor 11 is disposed in the position 54, then ALZ has the value 1. If it is disposed at the rotational position 62, then ALZ has the value 3. (This naturally applies in precisely the same way to starting in the preferred direction 14.)

After this, ALZ is tested in step S170. According to FIG. 5, ALZ>4 means that the rotor 11 has climbed over five of the (symbolic) "hills" 50, 56, 60, etc., in fact exclusively during times in which DIRS_DIR was true, i.e. that five signal changes K were counted during this state, but that no signal change K occurred during a time in which DIR_S≠K DIR was true. This means that the motor 10 has started and therefore, in step S172, the variable SW is preset again, i.e. a new initial value for SW is loaded into the relevant register, in the event of subsequent stoppage of motor 10 (e.g. if it is stopped manually), the startup control can function defined again from the start, namely from $SW_1$. Therefore, this is then the same variable SW as in step S112. Since the motor 10 is running now, the register MOT_ST is reset to 0 in step S174 so that in step S116 (FIG. 7), the start routine (S118) is no longer restarted.

In the execution of the start routine, every branch leads to step S164. Here, IWZ is increased by 1 and then, in a step S171, IWZ is, if need be, compared (in a starting attempt) to a constant value C, which corresponds, for example, to a time of 400 ms, but in internal time units of the microprocessor 70, namely the number of passes through the endless loop S130 (FIG. 7).

If IWZ is less than the value C, then the program skips via branch S175 directly to the end of the startup routine, i.e. to step S184. (Branch S175 may contain NO-OP commands for the reasons explained above, but these are not so important in the start routine.)

If IWZ is greater than the value C, this means that the motor 10 has not started, but has just rotated counter to the desired direction (through step S146)—starting at the value $SW_2$—in order to "wind up for the start" so to speak, and that the motor must now be switched over again to the rotation direction DIR set by the user. In step S173, the counter IWZ is reset to 0 and in step S176, the variable $SW_n$ is set—looking ahead—to the next lower value $SW_{n+1}$.

If the variable SW has been set to the lowest permissible value in S176, e.g. to $SW_{14}$, then this is detected in step S180 and corrected in step S182, by virtue of the fact that the initial value (see S112) is used again for SW, i.e. $SW_1$, for example. This is necessary so that with a startup attempt, the time during which the motor attempts to start up in the desired direction is always greater than the time during which it runs in the "wrong" rotation direction during startup.

Figure 9:
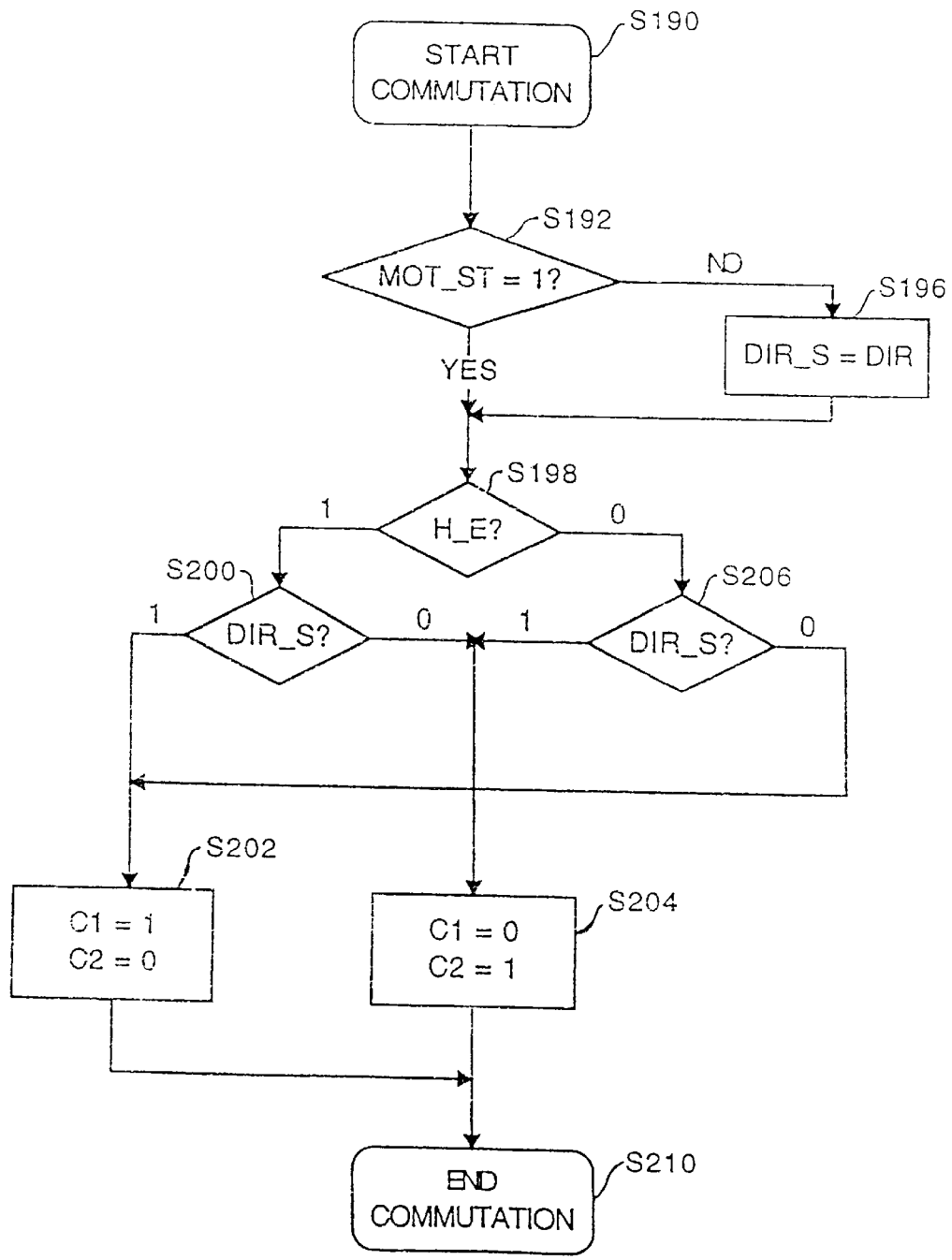
FIG. 9 is a flowchart which shows the execution of the commutation control with the motor according to FIG. 6.

FIG. 9 shows the execution of the commutation (S120 in FIG. 7), which begins in step S190. In step S192, a test is carried out as to whether the register MOT_ST is set, i.e. whether motor 10 is in its start routine, or is already rotating.

If the transition to the program part of FIG. 9 did not occur from the start routine (FIG. 8), i.e. MOT_ST=0, then for safety's sake, the signal DIR_S is corrected in step S196, that is, DIR_S=DIR, i.e. the rotation direction command DIR preset at switch S1 is taken into the internal register DIR_S, so that the motor 10 continues to run in the desired rotation direction. This is checked at each pass through the loop S130 (FIG. 7) and represents an advantageous safety measure.

Figure 10:
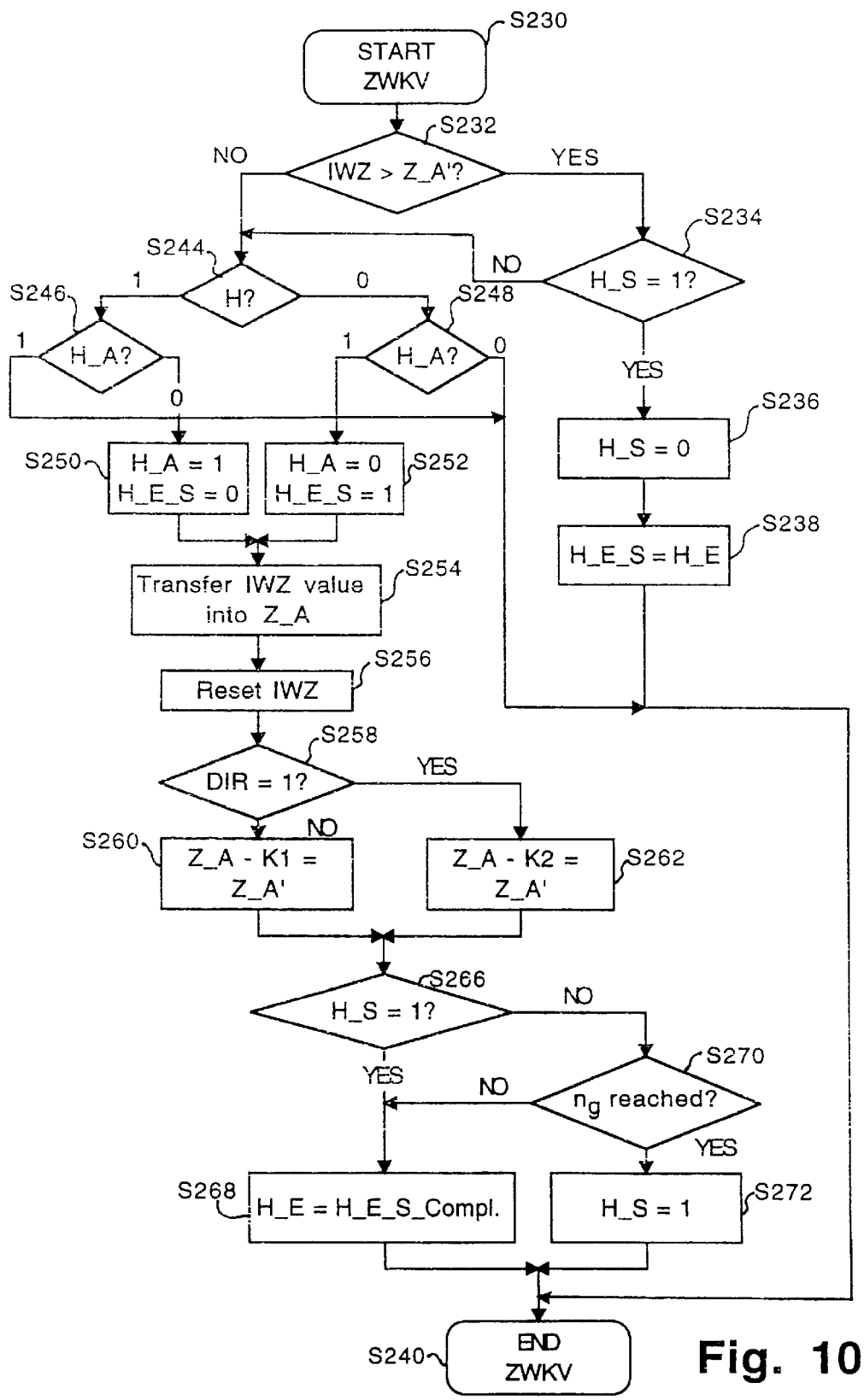
FIG. 10 is a flowchart which shows the execution of the advance angle shift with a motor according to FIG. 6.

In step S198, the signal H_E is polled, which was defined during startup in S154 and S158 and is produced according to FIG. 10 when the motor is running. This is a synthetic signal for the control of the commutation.

If H_E=1, then a test is carried out in step S200 as to whether DIR_S=0 or 1. If DIR_S=1, then the program proceeds to step S202 and in it, the port C1 of the microprocessor 70 is raised to HIGH so that the transistor 92 is switched on and the winding phase 20 receives a current $i_1$. If DIR_S=0, then in step S204, the port C2 is set equal to 1 so that the transistor 96 is switched on and the winding phase 21 receives a current $i_2$. The other of the two phases or strands is respectively without current, i.e. in S202, the port C2=0 and in S204, the port C1=0.

If H_E=0 in step S198, then a test is likewise carried out in step S206 as to whether DIR_S=0 or 1. When DIR_S=1, step S204 follows, and when DIR_S=0, step S202 follows, both of which have been explained above.

The program thus operates with a synthetic signal H_E for controlling commutation, and depending on the specified rotation direction DIR (steps S200, S206), this signal controls the current through the phases or strands 20, 21, so that the desired current supply and thus the desired rotation direction are produced. The values at the ports C1 and C2 of the microprocessor 70 each remain stored until the next pass through the loop S130.

After S202, 204 comes the step S210, i.e. the commutation is then finished and according to FIG. 7, the program returns to step S116 in the loop S130 (FIG. 7).

Mode of operation of FIGS. 7 and 8

With the initialization (S112) after the motor 10 is switched on, the register MOT_ST in the microprocessor 70 is set and for the time being, the variable SW is set, for example, to the value $SW_1$=C (S171). Therefore in step S116 of FIG. 7, the program proceeds into the left branch, i.e. the start routine S118, whose structure is depicted in FIGS. 8A and 8B. In this start routine, with each passage through the loop S130, a test is carried out in step S142 as to whether IWZ has already reached the value $SW_v$.

Then in FIG. 8A, the middle part is only executed if a change K of the rotor position signal H (FIG. 5) has been detected in steps S150, 152, 156.

In the start routine, a signal change K during driving in the desired rotation direction (S160, left outlet) produces a resetting of IWZ to 0 (S166), an increase of ALZ by 1 (S168), and a test (in S170) as to whether the startup has occurred, i.e. whether five signal changes K have occurred during driving in the desired rotation direction.

In the start routine, a signal change K when during driving counter to the desired rotation direction does not produce a resetting of IWZ to 0, since in this instance, the response in step S160 is NO and therefore the counter ALZ is reset in step S162.

If no signal change K is detected during driving in the desired direction, then a test is carried out in S171 (FIG. 8B) as to whether IWZ has already reached the value C and if need be, the events that have been described in conjunction with S173, 176, 180, and 182 occur next. Namely, if within time C, e.g. 400 ms, no signal change K has been detected during driving in the desired direction (this would have reset the counter IWZ to 0 in step S166), this indicates that the motor is still not rotating, but is in the phase of its controlled forced oscillation, so that the start routine S118 (FIG. 7) must be correspondingly modified, in order to increase the amplitude of the forced oscillation in the next attempt, and thus to improve the chances of a startup. This occurs through the use of a new value $SW_{n+1}$.

In the start routine, if it is determined in step S142 that IWZ has reached the set threshold value $SW_v$, e.g. $SW_1$=400 ms (succeeded by $SW_2$=380 ms, $SW_3$=360 ms, etc.), then this means, for example, that a) either no commutation has occurred since the switching on of the motor within the time predetermined by the value SW during driving in the desired direction, or b) that since the last commutation K, no new commutation has occurred within the time $SW_v$, so that the rotor 11 "is stuck", e.g. at the point A of FIG. 11, and rotates no further.

In this instance, the rotation direction signal DIR_S is inverted in step 146, i.e. starting from the time IWZ=$SW_v$, the motor 10 receives the command to run in the "wrong" direction, which produces the forced oscillation explained above.

Directly after the startup, for example, $SW_1$=C, i.e. for the reasons explained above, first a startup is attempted without this kind of reversing and at the end of this process, if the motor has not started, IWZ is reset to 0 in step S173 and the threshold SW is set to $SW_2$ (S176), as depicted in FIG. 12b.

Then, in the next cycle (with this new monitoring value $SW_2$ of 380 ms, for example), the motor is driven in the desired rotation direction (S142, 144), wherein, for example by commutation at point K, it reaches position A (FIG. 11) again and for the remaining 20 ms, it is driven in the opposite direction (S146) until IWZ=C (S171), as FIG. 11 indicates by means of line 212, wherein it reaches position C, for example, which is disposed to the left of SS3 in FIG. 11 by an angle γ.

As a result, "the motor winds up", i.e. in the next start attempt, it receives a current during this additional angular region γ (FIG. 11) and consequently an electromagnetic torque $T_{el}$ for the desired rotation direction, and in the process, can possibly leap the hurdle of the braking reluctance torque 46 according to line 213 of FIG. 11.

If this is not yet the case even now, then in the next attempt, the variable $SW_v$ is set to a still lower value, e.g. to $SW_3$=360 ms, so that when running backward, the motor receives current for 40 ms; here too, a commutation occurs at point K, but no resetting of IWZ occurs since DIR_S≠DIR (S160) and step S166 therefore is not reached. Thus rotor 11 reaches the rotational position D (FIG. 11) and consequently during the next start attempt, receives current for the desired rotation direction during an even greater rotation angle δ, and will start all the more reliably.

The rotational positions C, D are also shown in FIG. 4, i.e. the start position SS3 is shifted further and further toward the left by these forced oscillations (with increasing amplitude), e.g. from 150° el. to 130° el., then to 110° el., etc., until finally, the unstable start position IS3 is almost reached, from which a reliable start is possible in any case.

In actual use, this has the effect that when starting in the reverse direction, the motor 10 only rarely will start up directly, in most cases, though,—by means of the forced oscillation described—it will swing back and forth for a short time first and start up only after this. This is true even if the rotor is braked in so doing, for example if one attempts to manually hold the rotor 11 of a fan still.

As shown in FIG. 5a, it can also come to pass that the motor 10 starts up normally from the position SS3 (on the left in FIG. 5a) and reaches the rotational position 62, i.e. makes a full rotation of 360° el. and then "gets stuck", because it did not receive enough "momentum".

In the rotation from SS3 to SS4, the start routine detects a signal change K (steps S150, 152, 156), and this leads to the resetting of IWZ in S166, the increase of the counter ALZ to the value 1 in S168, the increase of the (previously reset) counter IWZ from 0 to 1 in S164, and in FIG. 9, to a corresponding commutation with the values H_E from S154 or 158. The value SW (from S112) is not changed in the course of this since the program bypasses steps S173, S176, S180, S182 via the branch S175 (FIG. 8B).

The same is true for the subsequent rotation of rotor 11 from SS4 to SS3 (FIG. 5a). In this instance—with the signal change K—a commutation of the current in motor 10 occurs again, IWZ is reset to 0 again, and ALZ is increased to the value 2 in step S168.

After the rotor position SS3 (on the right in FIG. 5a), the rotor 11 in this example rotates further to the rotational position 62, by means of which a commutation K is produced again, i.e. counter IWZ is reset to 0 again in S166, counter ALZ is set to the value 3 in S168, but since the rotor 11 is now "stuck" at point 62 (FIG. 5a) and is no longer rotating, now the loop S130 (FIG. 7) is continuously passed through, by means of which the counter IWZ finally reaches the set value SW in step S142, i.e. at SW$_1$, for example, reaches the value 400 ms, and then reaches the value C in step S171, which in this instance can likewise be 400 ms.

By means of this, the counter IWZ is reset to 0 in S173, the value SW$_1$ (400 ms) is replaced by the next lower value SW$_2$ (380 ms) in S176, and a new start attempt is now made in the manner described above, i.e. the motor 10 receives a current for the desired rotation direction for 380 ms (step S142), and if it does not start during this 380 ms, i.e. no signal change K occurs within this time span, it receives a current for rotation counter to the desired rotation direction for the next 20 ms (S146) so that the forced oscillation thus begins again automatically, wherein by means of the signal change K, the counter ALZ is automatically set to 0 (by means of the steps S160, 162) during the rotation starting from the point 62 (FIG. 5A) counter to the desired rotation direction, and then begins to count again when the motor starts in the desired rotation direction. In addition, this signal change K produces a commutation during the rotation counter to the desired rotation direction (S150, 152, 156).

Only when the rotor 11 has produced five changes K of the signal H—when DIR_S=DIR (S160), i.e. with rotation in the desired direction—does the startup counter ALZ achieve the value 5 and the start routine is then terminated in the steps S170, 172, 174, by virtue of the fact that MOT_ST is set equal to 0.

Therefore, for so long as ALZ<5, the startup is continuously monitored by the start routine S118 and if the motor does not start up, the start attempts are repeated.

In order to prevent overheating when the rotor 11 is blocked during starting and cannot rotate, a so-called "stall protection" safety measure can be provided, i.e. if the thermal burden of the motor 10 becomes too high, it is switched off for 10 or 20 seconds, for example, and only then repeats the startup attempts. A corresponding device is the subject of German Patent Application 195 47 216.0, dated Dec. 18, 1995 corresponding to European application No. 780962 published on Jun. 25, 1992.

For the duration of the start routine S118, the startup is therefore monitored by virtue of the fact that a determination is made as to whether a commutation occurs within the (variable) time SW or within the (constant) time C and whether this commutation occurs while DIR_S=DIR or while DIR_S≠DIR. The startup routine is only switched off when, with ALZ=5 (S170), a criterion exists from which it can be assumed that the motor 10 has reliably started.

If the normally rotating motor is stalled by external influences, then an overflow of IWZ occurs (FIG. 7: S132), and as a result, the start routine is automatically switched on again in step S134, i.e. the register MOT_ST is set again and the starting process, which has already been extensively described, repeats, i.e. the left branch S118 of the flowchart in FIG. 7 is passed through again.

It should also be emphasized that it is important for the passage through the right branch of FIG. 7 (S124, 126, 128, 132) and the step S120 to always require the same total amount of time, independently of which branch or path this passage takes, whereas this is desirable but not absolutely necessary for the start routine S118, because this becomes effective only for a few seconds after the start of the motor, so that exact run times through the loop S130 are less important in the start routine S118 than in the continuous running of the motor, in which these run times are used for internal measurement procedures of the program, see S254, 260, 262 in FIG. 10.

The Advance Angle Shift

With the motor according to FIG. 1, the rotor position sensor 25 is disposed at a pole gap, i.e. in FIGS. 1 and 3 at 0° el., and a change K of the Hall signal H is consequently produced at 0° el., 180° el., 360° el., etc.

With high-speed motors, though, in order to optimize performance and efficiency, it is necessary to shift the rotor position sensor 25 counter to the rotation direction (14 in FIG. 1) by a few degrees, e.g. to the position labeled as 25' in FIG. 1. One may then speak of—analogously to an internal combustion engine—an "early ignition," because by means of this, the currents i$_1$ and i$_2$ (FIG. 6) are switched on somewhat earlier. This is primarily advantageous at high speeds and permits a higher performance and an improved efficiency at these speeds. (Naturally, nothing is actually "ignited" in a motor of this kind.)

A shifting of the rotor position sensor 25 to the position 25', though, would signify a late ignition in the opposite rotation direction (40 in FIG. 3), i.e. the motor 10 would then exhibit poor performance and poor efficiency when operating in the reverse direction. In addition, it would be difficult to get it to start at all in the reverse direction 40.

For this reason, two rotor position sensors would have to be used, a first one for the operation in the preferred direction and a second one for the reverse operation, but this is not possible for cost reasons. Furthermore, it is desirable for the startup that the rotor position sensor 25 be disposed in the neutral zone, i.e. at 0° el., as shown in FIG. 1, or at 180° el., because an early ignition is only meaningful at higher speeds, while in the stopped state, it could possibly make the startup difficult or impossible.

When using the invention, it is possible to manage with only one rotor position sensor 25, whose signal H is electronically shifted, so that it is adapted to the rotation direction and speed of the motor 10. Thus a signal H__E is used for the commutation, i.e. a replacement signal, which is adapted to the criteria mentioned (rotation direction and speed). This type of production of an angularly shifted, synthetic commutation signal H__E is suited for all types of electronically commutated motors and is not limited to two-pulse motors.

The program part (S126 in FIG. 7) for the advance angle shift ZWKV is represented in FIG. 10. It is initiated in step S230. In step S232, the counter setting of IWZ is compared to the value Z__A', which was calculated in S260 or S262 in an earlier pass through the loop S130.

If IWZ has exceeded the value of Z__A', then the program proceeds to step S234 in which the register H__S (Hall start) is polled, which controls the state of the synthetic Hall signal H__E after each change of the signal H. If the register H__S is set, this indicates that the speed of the motor 10 is high enough to begin the advance angle shift. Below a predetermined speed $n_s$, no advance angle shift occurs (steps S268, 270, 272).

If H__S=1, then the register is subsequently reset in step S236 (after the polling), i.e. H__S=0, so that in the next passes through the loop S130 (FIG. 7), the signal change detection can be carried out, i.e. the steps S244, 246, and 248.

In step S238, the value of H__E is set equal to that of H__E__S, the generation of which will be described below (steps S250 and S252), i.e. in this pass through loop S130 (FIG. 7), the commutation of the motor 10 is produced by the signal H__E (with the value H__E__S) generated in S238, if need be, modified by the signal DIR, see the steps S198, 200, and 206 of FIG. 9.

After step 238, the program proceeds to step S240, i.e. the end of the advance angle shift, since the advance angle shift has in fact taken effect in step S238.

If H__S=0 in step S234, then the program proceeds to S244 just as when there is a negative response in S232. In S244, a test is carried out as to which value the signal H has.

Step S244 has two steps S246 and S248 disposed beneath it in the form of a binary tree, and these are identical to the steps S150, 152, and 156 of FIG. 8A, so please refer to the description there. (Steps S150, 152, and 156 are only effective during the start routine, steps S244, 246, and 248 are effective only during the normal running of the motor.) Steps S244, 246, and 248 are used to detect a change of the signal H. This change is labeled as K in FIG. 5. If no change of the signal H is detected, the program proceeds to step S240, i.e. the end of the advance angle shift.

If the binary tree S244, 246, 248 detects a change of the signal H, then it is followed by step S250 if H has changed from 0 to 1. In S250, the new signal H is stored in the register H__A, i.e. H__A=1, in order to be able to detect this change once more with a subsequent change of the signal H. The register H__E__S assumes the complementary value of H, i.e. in step S250, H__E__S=0. This stored value is used, if need be, in step S238; the same thing happens subsequently in step S268, in which H__E__S is changed into the value H again by a formation of a complement.

If the signal H has changed from 1 to 0, then the analogous changes are carried out in step S252, i.e. H__A=0 and H__E__S=1. This signal H__E__S is also used, if need be, in S238 or S268.

When there is a change of the signal H (this change is labeled as K in FIG. 5 and is detected by means of the steps S244, 246, 248), the measurement of time interval T is terminated, which is carried out in the counter IWZ, and therefore the content of IWZ is transferred into Z__A in step S254 and then the counter IWZ is reset to 0 in step S256 so that a new measurement of T (FIG. 5) can begin. Therefore Z__A contains a measurement value T for the speed measurement just made, i.e. the higher the speed is, the smaller this value T is. (The resetting of IWZ in step S166 or 173 is only executed in the start routine.)

In step S258, the externally preset rotation direction DIR is polled. This can be supplied to the port BO (FIG. 6) as a digital signal from an external controller or regulator. The program proceeds to step S260 or S262, depending on the predetermined or prespecified rotation direction.

Let it be assumed by way of example that S260 relates to forward rotation and S262 relates to reverse operation. In both cases, a constant is substracted from the counter setting in Z__A, which constant has the value K1 in forward operation and K2 in reverse operation, and the result is stored as a new value in Z__A'. (This value Z__A' is then compared to the content of the counter IWZ in step S232.)

This results in an advance angle shift that is a function of direction and speed since, depending on the state of the signal DIR, either the constant K1 or the constant K2 is subtracted from the value Z__A, in order to obtain Z__A'.

At low speeds, T is long (FIG. 5), i.e. the value in the register Z__A is large, and therefore Z__A is hardly changed at low speeds when Ki or K2 is subtracted, i.e. Z__A' is then only slightly smaller than Z__A. This is depicted by way of example in FIG. 13, for a speed of 1000 n.

At high speeds, T is short, i.e. the value in the register Z__A is small, and therefore Z__A is changed greatly at high speeds when K1 or K2 is subtracted, i.e. the value Z__A' differs sharply from the value Z__A when the speed is high. This is depicted by way of example in FIG. 14, for a speed of 5000 n. A comparison of FIGS. 13 and 14 graphically depicts the dependence on speed.

In this manner, the shift of the advance angle is a linear function of speed, because the value Z__A corresponds to the time interval that the motor needs for one rotation through an angle of 180° el. so that for example in FIG. 13, the early ignition would be approximately 6° el., but in FIG. 14, it would be 30° el. In actual use, the early ignition at 5000 rpm is approximately 12 to 15° el., i.e. the depiction in FIGS. 13 and 14 is somewhat exaggerated for the sake of clarity.

The constants K1 and K2 could also be made a function of the speed range, thus for example K1=a for 0 to 1000 rpm, K1=b for 1000 to 2000 rpm, etc. In this manner, the advance angle shift could be further optimized, if so desired, over the entire speed range. However, it has turned out to be the case that the embodiment depicted produces outstanding results in actual use.

In operation, a change K (FIG. 5) of the signal H can occur before the requirement of step S232 has been fulfilled. This is possible, for example, with strong acceleration of the motor, i.e. during the run-up after switch-on, or as a result of asymmetries of the Hall signal H, or due to interference pulses. As it also turns out from FIGS. 1 and 3, the symmetry of the signal H is a result of the symmetry of the magnetization of the rotor 11, and if this magnetization is asymmetrical, e.g. due to defects in the magnetic material, then the signal H is also asymmetrical. The present program takes this into account.

In the course of this, the new signal H_E (with the value H_E_S) cannot be produced in step S238 since the response YES does not occur in step S232, but only the response NO, which with a change K of the signal H, leads to the steps S254, 256, . . . 266, i.e. no commutation would intrinsically result since there is no value for H_E.

If in this instance—from the (earlier) step S272—the register H_S=1, with a change K of the signal H, the program proceeds from step S266 to step S268 and there, in this instance, the complementary value of H_E_S, which is identical to the value H, is used for the signal H_E, see steps S250 and 252, i.e. the motor in this instance is commutated by the "original signal" H of the sensor 25, and a shift of the advance angle consequently does not occur.

If this measure were not taken, then in these special instances, no commutation would occur at all, i.e. the motor would brake itself. The step S266 is necessary in order to reach step S268 here and to assure a commutation of the motor—even if at a less optimal time.

In step S266, if the register H_S=0, then in S270, the content of Z_A, i.e. the time T (FIG. 5), is compared to a fixed value, which corresponds to a predetermined limit speed $n_g$, i.e. a test is carried out as to whether the speed has reached $n_g$. The shift of the advance angle becomes effective only starting at this limit speed, e.g. only starting at 1000 rpm; if this limit speed has not been achieved, the program in this instance, also proceeds to step S268, in which—as explained above—the original signal H, which corresponds to the complementary value of H_E_S., is used for the commutation.

If the limit speed $n_g$ has been reached, then the register H_S is set in step S272 and the information H_E_S from steps S250, 252 is no longer changed in this run. The prior signal H_E thus is retained so that nothing charges in the steps of FIG. 9. Only when the value Z_A', which is calculated in step S260 or S262, has expired, which, as described, is tested in step S232, is the prior signal H_E replaced (by means of step S238) by a new signal with the value H_E_S, which has been previously calculated in S250 or S252. As a result, therefore, after the expiration of this calculated value Z_A', a new signal H_E is generated by S238 for the commutation and represents the complementary value of H according to FIG. 15b. The signal H_E is thus disposed chronologically before the corresponding signal H, i.e. the switching on of the current in the relevant phase of motor 10 occurs somewhat earlier chronologically, i.e. with "early ignition," wherein the angle of the early ignition is a function of rotation direction (signal DIR, constants K1 or K2) and speed (signal Z_A').

FIG. 15b shows that for the duration of Z_A', the values of signals H and H_E agree, but not after the expiration of Z_A', since then, the signal H_E is changed by means of step S238 and is set to the complementary value of H. This new signal H_E then remains stored until it is changed again either by S238 or S268, in order to produce a commutation of the current in the motor 10.

Mode of operation of the Advance Angle Shift

In this connection, please refer to FIG. 15.—Below the limit speed $n_g$ no shift occurs, i.e. in step S268 in this instance, H_E is set equal to H, as just explained.

Above $n_g$, the register H_S is set in step S272 and at a change of the signal H, the value Z_A is determined in step S254 and is inversely proportional to the speed. Either the constant K1 (S260) or K2 (S262) is subtracted from this value, depending on the rotation direction (S258).

In the passage through loop S130 (FIG. 7) in which the value IWZ becomes greater than Z_A' (S232), the value H_E_S (from S250 or 252) is output in step S238 and produces a commutation with the corresponding early ignition in the same regulation loop (in step S120).

In FIG. 15, the signal H changes from 1 to 0 at instant $t_1$ and the value in the counter IWZ is measured starting from this instant $t_1$, and when it has reached the value Z_A', H_E=1 (from step S252) is output in step S238 (above the speed $n_g$).

At instant $t_2$ in FIG. 15, the signal H changes from 0 to 1. Starting from this instant $t_2$, the value in the counter IWZ is measured and when IWZ has reached the value Z_A', the value H_E=0 (from step S250) is output in step S238 and produces a correspondingly early commutation, i.e. an "early ignition".

In this manner, above the speed $n_g$, the commutation is carried out with early ignition by means of the signal H_E, namely as in FIG. 1, when the sensor 25 would be shifted continuously further counter to the rotation direction 14 with increasing speed (as indicated at 25'), and likewise in FIG. 3, the sensor would be shifted counter to the rotation direction 40 there, i.e. counter to the reverse direction.

FIGS. 16 and 17 show a variant of the invention in which the startup in the reverse direction, after the motor is switched on, proceeds somewhat differently than the startup in the forward direction. The difference relates to the initialization process in FIG. 7, i.e. the steps S112 and S114 there.

In FIG. 7, step S112, the variable SW for both rotation directions is preset with the value $SW_1$, which, as explained, produces a slight delay during startup. This delay is prevented in the variant according to FIGS. 16 and 17.

According to FIG. 16, in step S112a, the value DIR (for the desired rotation direction), which value is set at the port BO, is loaded into the register DIR_S and the register MOT_ST is set, just as in step S112 of FIG. 7.

Then the set rotation direction DIR is polled in step S280. If the motor is intended to be running in the preferred direction (DIR=0), then in step S282, the variable SW is preset with the value $SW_1$, which corresponds to the constant C (see S171) according to FIG. 12a, just as in step S112 of FIG. 7, and the counter IWZ is reset to 0. The next step S114 and the entire subsequent program are identical to FIG. 7, so please refer to FIG. 7 and the accompanying description. Also the program execution for DIR=0 is identical to the execution that has already been described extensively in conjunction with FIG. 7.

If it is determined in step S280 that DIR=1, i.e. the motor is intended to run in the reverse direction, then in step S284, the variable SW is preset with the value $SW_2$, which according to FIG. 12b is slightly smaller than the constant C. The latter may, for example, have the value 400 ms, and $SW_2$ may have the value 380 ms. Also, the counter IWZ is preset to the value $SW_2$ in S284, i.e. likewise to 380 ms, for example. In this instance as well, the program then proceeds to step S114.

Please refer to FIG. 17 for explanation. The start position SS3 will be assumed to be the rest position of the rotor 11 and it will be assumed that a start in the reverse direction (40 in FIG. 3) is desired.

Since in this instance, due to step S284 of FIG. 16, after being switched on, the counter IWZ already contains the value $SW_2$, in step S142 (FIG. 8A) after being switched on, the response YES will immediately be generated and the program will proceed directly to step S146, in which the complementary value of the specified signal DIR is loaded into the register DIR_S, so that with the subsequent control of motor currents (S120 in FIG. 7 or FIG. 9), the motor 10 is immediately supplied with current, counter to the desired rotation direction, and in fact until the counter IWZ reaches the value C in step S171 (FIG. 5B). This corresponds to the time duration e in FIG. 12b, i.e. 20 ms, for example.

During these 20 ms in FIG. 17, after starting from the rest position SS3, the rotor 11 is rotated along the (symbolic) path 290, to the angular position E, which is also indicated in FIG. 4, and this rotation occurs counter to the desired rotation direction, i.e. in this example, in the preferred rotation direction of the motor.

In the position E, the counter setting of IWZ becomes greater than C in S171, and consequently the counter IWZ is reset to 0 in S173 (FIG. 8B), and $SW_2$ is replaced by $SW_3$ in S176. Then, in the next passage through the loop S130, the program reaches step S142 in which the response is now NO, i.e. now, the (correct) value DIR is loaded into the register DIR_S in S144 so that subsequently in step S120 (or FIG. 9), the motor 10 is switched over into the desired direction (=reverse direction) and the rotor 11 is driven in the reverse direction, i.e. along the (symbolic) path 292 in FIG. 17. A commutation occurs at the point K.

Since starting at the rotational position E, the rotor 11 can now attempt to start during an angle ϵ, it can better climb the (symbolic) "hill" 46, i.e. it can better overcome the braking reluctance torque 46 of FIG. 4, so that a startup in the reverse direction is now more possible, as indicated in FIG. 17.

If a startup does not occur, then the further course is the same as in FIG. 7, i.e. the next time, the rotor 11 (at the value $SW_3$, see FIG. 12c) is driven counter to the desired rotation direction, e.g. for 40 ms, and thus can start up even better, i.e. in so doing, the angle ϵ in FIG. 17 increases.

Depending on the type of object the motor 10 is intended to drive, for starting in the reverse direction, the value $SW_3$ or $SW_4$ could also be used in step S284 as the initial value for the variable SW and for IWZ in order to obtain a sufficiently great amplitude ϵ (FIG. 17) for the first part of the forced oscillation. If so desired, the variable SW can also be preset in step S172 corresponding to the set rotation direction, but the embodiment according to FIG. 8A is preferable since the motor could possibly be reversed by its user and then in any case, the startup with the value $SW_1$ assures a reliable startup in both rotation directions.

Other alterations and modifications are possible in a number of ways within the scope of the invention.

What is claimed is:

1. A method of starting a two-pulse, electronically commutated direct current motor, designed for operating in a preferred direction, in one of two rotation directions, referred to below as "desired rotation direction," comprising the following steps:
   a) starting supply of current to the motor, then driving the rotor of the motor into forced oscillation about its rest position by means of a start routing alternately supplying current to drive it in the one rotation direction and to drive it in the other direction;
   b) monitoring, during the start routine, whether the motor starts up; and
   c) exiting said start routine if it is determined that the motor has started up, then exiting the start routine.

2. The method according to claim 1, wherein said step of driving the rotor into forced oscillation, during a startup counter to the preferred direction, comprises at least one current supply cycle with a first time interval of supplying current counter to the desired rotation direction and a second time interval of supplying current in the desired rotation direction.

3. The method according to claim 2, wherein, with each sequence of succeeding current supply intervals taking place during the start routine, the time interval for current supply counter to the desired rotation direction (FIG. 12: DIR_S=/ DIR) is shorter than the time interval for current supply in the desired rotation direction.

4. The method according to claim 3, wherein, with succeeding current supply cycles of the start routine carried out for producing a forced oscillation, the ratio of the duration of the current supply for rotation in the desired rotation direction to the duration of the current supply for rotation counter to the desired rotation direction is altered in a predetermined way.

5. The method according to claim 2, wherein, with succeeding current supply cycles of the start routine carried out for the purpose of producing a forced oscillation, a sum (C) of the durations of current supply for rotation in the desired rotation direction and durations of current supply for rotation counter to the desired rotation direction is kept essentially constant from cycle to cycle.

6. The method according to claim 1, further comprising the step of counting, during the supply of current to the motor for rotation in the desired rotation direction, which is produced during the start routine, the number of signal changes (K) occurring in the output signal (H) of a rotor position sensor associated with the motor.

7. The method according to claim 6, further comprising the step of leaving the start routine when the number of signal changes (K) has exceeded a predetermined minimum value.

8. The method according to claim 1, further comprising, during the start routine, monitoring whether the rotor of the motor has reached a predetermined rotational position or has reached one out of a plurality of predetermined rotational positions within a predetermined time span (SW) starting from one of the beginning of the current supply for rotation in the desired rotation direction and passage of the rotor through a predetermined rotational position while rotating in the desired rotation direction.

9. The method according to claim 8, wherein during the start routine, when the rotor has achieved the predetermined rotational position or has achieved one out of a plurality of predetermined rotational positions within the predetermined time span while being supplied with current for rotation in the desired direction, starting from this point, monitoring is once again performed as to whether the rotor has reached a new predetermined rotational position or one out of a plurality of predetermined rotational positions within the predetermined time span starting from the passage through this rotational position, and if the rotor successfully does so, this monitoring process is performed a predetermined number of times.

10. The method according to claim 8, wherein, if the rotor of the motor has not reached a predetermined rotational position within a first predetermined time span, the current supply of the motor is switched over for driving the motor counter to the desired rotation direction.

11. The method according to claim 10, wherein the duration of supply of current for driving the motor counter to the desired rotation direction is limited to a second predetermined time span and after this time span expires, the motor (10) is switched over again to current supply for driving it in the desired rotation direction.

12. The method according to claim 11, wherein with the renewed current supply for driving in the desired rotation direction, monitoring is again performed as to whether the rotor of the motor has reached a predetermined rotational position or has reached one out of a plurality of predetermined rotational positions within a predetermined time span starting from one of the beginning of the current supply in the desired rotation direction and passage of the rotor through a predetermined rotational position in the desired direction.

13. The method according to claim 12, wherein, if the rotor of the motor has not reached the predetermined rotational position or one out of a plurality of predetermined rotational positions within the predetermined time span, the current supply of the motor is switched over again for driving it counter to the desired rotation direction.

14. The method according to claim 13, wherein the time interval, for a second current supply to the motor counter to the desired rotation direction, is extended in comparison to the predetermined time interval for the first current supply counter to the desired rotation direction, in order to produce a forced oscillation with increasing amplitude.

15. The method according to claim 8, wherein the positions that are used as predetermined rotational positions of the rotor are those in which a rotor position sensor, provided on the motor, changes its output signal in a predetermined manner.

16. The method according to claim 15, wherein the rotational positions (K) that are used as predetermined rotational positions of the rotor are those in which the stator current of the motor is commutated, at least during the start routine.

17. A method of starting a two-pulse, electronically commutated direct current motor, designed for operating in a preferred direction, in a rotation direction counter to said preferred direction, comprising the following steps:
  a) after switching on, supplying the motor during a first time span with current for driving it in the preferred direction;
  b) subsequently, switching over the current supply for driving the motor in a rotation direction counter to the preferred direction;
  c) monitoring the startup during step (b);
  d) switching over the current supplied to said motor, for driving it in the preferred direction if it is determined that a startup has not occurred, supplying current during a second time span which is longer than the first time span;
  e) after this second time span has expired, switching over again the current supply of the motor for driving it in the rotation direction counter to the preferred direction.

18. The method according to claim 17, further comprising, prior to step (a), the step of supplying the motor with current for rotation in said preferred direction and monitoring its startup in said direction by determining how often a commutation (K) occurs under predetermined conditions.

19. The method according to claim 18, further comprising skipping steps (a)–(e) if the startup of the motor in the desired direction is detected in the respectively preceding step of claim 18.

20. The method according to claim 17, further comprising, prior to step a), the step of supplying the motor with current for rotation in said preferred direction and monitoring its startup in said direction by determining how often a commutation (K) occurs under predetermined conditions.

21. A method of starting a two-pulse, electronically commutated direct current motor, designed for operating in a preferred direction, in any desired rotation direction including said preferred direction and a direction counter to said preferred direction, comprising the following steps:
  a) starting the motor in the desired rotation direction;
  b) monitoring the startup during step a);
  c) switching over the current supplied to said motor for driving it counter to said desired direction during a first predetermined time span if it is determined in said monitoring step b) that no startup has occurred, so that the motor is driven counter to the desired rotation direction during this time span;
  d) switching over again the current supplied to said motor for driving it into the desired direction, after the first predetermined time span has elapsed, and
  e) monitoring the startup during step d).

22. The method according to claim 21, further comprising performing steps b), c) and d) again after step d) if the startup in the desired rotation direction does not occur, using a second time span which is greater than said first predetermined time span.

23. The method according to claim 22, wherein further comprising performing steps b), c) and d) again after step d) when the startup does not occur in the desired rotation direction, using a third time span which is greater than said second predetermined time span.

24. The method according to claim 21, further comprising the step of counting the number of commutations occurring during the startup procedure, when current is supplied to said motor for driving it in the desired direction.

25. The method according to claim 24, further comprising the step of stopping said counting if a commutation process (K) occurs during current supply for driving the motor counter to the desired rotation direction.

26. The method according to claim 24, further comprising the step of switching the motor over to normal commutation in the desired rotation direction if, during the startup, a predetermined number of commutations (K) has been counted when driving the motor in the desired rotation direction.

27. In a method of operating an electronically commutated direct current motor having a rotor (11) and a stator (15), said motor providing, in operation, rotor position signals (K) for influencing current commutation in said motor, said method comprising the steps of:
  a) repetitively determining, during rotation of the rotor, a first value (Z_A) for a time interval (T) needed by said rotor (11) to rotate between a first predetermined rotor position and a second predetermined rotor position;
  b) subtracting, from said first value (Z_A), a second predetermined value (K1; K2) to obtain a resulting value (Z_A');
  c) measuring a time interval proportional to said resulting value (Z_A'), beginning at a first rotor position signal (K);
  d) using a subsequent second rotor position signal (K) for controlling current commutation in said motor if said subsequent second rotor position signal (K) occurs during said time interval measuring step; and
  (e) using an endpoint of said time interval measuring step for controlling current commutation in said motor if no subsequent rotor position signal (K) occurs during said time interval measuring step.

28. The method according to claim 27, wherein
  during operation, a rotor position sensor (25), provided in the motor, changes its output signal (H) in a predetermined manner at said predetermined rotor positions.

29. The method according to claim 27, wherein the magnitude of said second predetermined value (K1; K2) depends on the rotation direction of said rotor.

30. The method according to claim 27, wherein the second value has a value (a, b) that is a function of the current speed range of the motor.

31. The method according to claim 27, further comprising the step of outputting a commutation signal (K) defined by the output signal (H) of a rotor position sensor (25) provided on the motor (10), in the first and second predetermined rotor position when the speed of said motor is below a predetermined limit speed ($n_g$) limit steed ($n_g$).

32. The method according to claim 27, wherein said time interval measuring step is started at said second predetermined rotor position.

33. The method according to claim 1, including the step of repetitively monitoring whether the rotor (11) has or has not reached a second predetermined rotor position within a predetermined time span starting from the passage through a predetermined first rotor position, and if not, switching over the motor to a start routine for the desired rotation direction.

34. An electronically commutated direct current motor having a control circuit including a control program which executes the steps of claim 1.

35. The motor according to claim 34, which is formed as a two-pulse motor with a reluctance auxiliary torque ($T_{rel}$), which during operation in the preferred direction (14) of said motor, is in approximate phase opposition to the electromagnetic drive torque ($T_{el}$) of the motor.

36. The motor according to claim 34, wherein the rotor position sensor (25) is so arranged that it changes its output signal (H) when the rotor (11) of the motor is located in a position in which no electromagnetic torque ($T_{el}$) can be produced by the motor.

37. The motor according to claim 35, wherein the rotor position sensor (25) is so arranged that it changes its output signal (H) when the rotor (11) of the motor is located in a position in which no electromagnetic torque ($T_{el}$) can be produced by the motor.

38. The method according to claim 17, including the step of repetitively monitoring whether the rotor (11) has or has not reached a second predetermined rotor position within a predetermined time span starting from the passage through a predetermined first rotor position, and, if not, switching over the motor to a start routine for the desired rotation direction.

39. The method according to claim 21, including the step of repetitively monitoring whether the rotor (11) has or has not reached a second predetermined rotor position within a predetermined time span starting from the passage through a predetermined first rotor position, and, if not, switching over the motor to a start routine for the desired rotation direction.

40. The method according to claim 27, including the step of repetitively monitoring whether the rotor (11) has or has not reached a second predetermined rotor position within a predetermined time span starting from the passage through a predetermined first rotor position, and, if not, switching over the motor to a start routine for the desired rotation direction.

41. An electronically commutated direct current motor having a control circuit including a control program which executes the steps of claim 17.

42. An electronically commutated direct current motor having a control circuit including a control program which executes the steps of claim 21.

43. An electronically commutated direct current motor having a control circuit including a control program which executes the steps of claim 27.

* * * * *

UNITED STATES PATENT AND TRADEMARK OFFICE
CERTIFICATE OF CORRECTION

PATENT NO. : 6,078,152
DATED : June 20, 2000
INVENTOR(S) : Dieterle et al.

It is certified that error appears in the above-identified patent and that said Letters Patent is hereby corrected as shown below:

INID [75] Inventors: "Herman Rappenecker" should be -- Hermann Rappenecker --.

Column 3,
Line 24, "Of" should be -- of --.
Line 36, after "C2" - "Muller/Papst Motoren" should be deleted.
Line 50, "and corresponding U.S. Patent No. 3,840,761" should be -- Muller/Papst Motoren --.
Line 65, after "C2" -- and corresponding U.S. Patent No. 3,840,761 -- should be inserted.

Column 9,
Line 48, "Silo" should be -- S110 --.

Column 10,
Line 27, after "195 45 109.0 dated Dec. 4, 1995)," -- and corresponding WO 97-21268, publ. 12 Jun. 1997, whose U.S. phase is U.S.S.N. 09/077,650 filed 2 JUN. 1998, -- should be inserted.
Line 34, "HBE" should be -- H_E --.
Line 55, after "94 118 728.8" -- and corresponding U.S. Patent 5,590,235 -- should be inserted.

Column 12,
Line 38, "DIRS_DIR" should be -- DIR_S = DIR --.
Line 40, "K" should be deleted.

Column 13,
Line 35, "DIR_S-O" should be -- DIR_S = O --.
Line 64, "SW," should be -- $SW_v$ --.

Column 17,
Line 28, "$n_s$" should be -- $n_g$ --.

Column 18,
Line 34, "Ki' should be -- K1 --.

Column 19,
Line 36 "charges" should be -- changes --.
Line 61 after "$n_g$" --,-- should be inserted.

UNITED STATES PATENT AND TRADEMARK OFFICE
CERTIFICATE OF CORRECTION

PATENT NO. : 6,078,152
DATED : June 20, 2000
INVENTOR(S) : Dieterle et al.

It is certified that error appears in the above-identified patent and that said Letters Patent is hereby corrected as shown below:

Column 21,
Line 5, "5B" should be -- 8B --.

Column 21, claim 1,
Line 8, "routing" should be -- routine --.

Column 25, claim 31,
Line 6, "steed" should be -- speed --.

Signed and Sealed this

Eighteenth Day of September, 2001

*Attest:*

Nicholas P. Godici

*Attesting Officer*

NICHOLAS P. GODICI
*Acting Director of the United States Patent and Trademark Office*